# (12) United States Patent
Muraoka et al.

(10) Patent No.: US 8,804,860 B2
(45) Date of Patent: Aug. 12, 2014

(54) COGNITIVE RADIO SYSTEM, COGNITIVE RADIO APPARATUS, AND RADIO SIGNAL DETECTION METHOD

(75) Inventors: Kazushi Muraoka, Tokyo (JP); Masayuki Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 599 days.

(21) Appl. No.: 12/994,680

(22) PCT Filed: May 25, 2009

(86) PCT No.: PCT/JP2009/059918
§ 371 (c)(1),
(2), (4) Date: Nov. 24, 2010

(87) PCT Pub. No.: WO2009/145326
PCT Pub. Date: Dec. 3, 2009

(65) Prior Publication Data
US 2011/0085612 A1    Apr. 14, 2011

(30) Foreign Application Priority Data
May 27, 2008  (JP) .................. 2008-137471

(51) Int. Cl.
*H04B 7/00*   (2006.01)
*H04L 27/28*  (2006.01)

(52) U.S. Cl.
USPC .......................................... 375/260; 375/343

(58) Field of Classification Search
USPC ......... 375/142, 147, 150, 152, 260, 262, 265, 375/343; 370/208, 319–321, 335, 337, 342, 370/344, 347; 708/422, 425, 426
See application file for complete search history.

(56) References Cited

U.S. PATENT DOCUMENTS

| 7,970,065 B2 | 6/2011 | Horiguchi et al. |
| 8,154,964 B2 | 4/2012 | Fujinami et al. |

(Continued)

FOREIGN PATENT DOCUMENTS

| CN | 1838572 A | 9/2006 |
| CN | 1956365 A | 5/2007 |

(Continued)

OTHER PUBLICATIONS

Shigenobu Sasaki, "A Study an Spectrum Sensing of DTV Signals in IEEE802.22 Wran", IEICE Technical Report, Jul. 26, 2007, pp. 103-108, SR 2007-37.

(Continued)

*Primary Examiner* — Young T. Tse
(74) *Attorney, Agent, or Firm* — Sughrue Mion, PLLC

(57) ABSTRACT

A radio system includes: a memory which stores a system parameter and a pseudo parameter, the system parameter being used for generation of a feature value specific to a search target radio system, the pseudo parameter being similar to the system parameter; a feature value generator which generates one or a plurality of the feature values based on a signal in a received frequency band by using the system parameter; a non-feature value generator which generates one or a plurality of non-feature values based on the signal in the received frequency band by using the pseudo parameter; and a determination section which determines whether or not a signal of the search target radio system exists by using the one or the plurality of the feature values and the one or the plurality of non-feature values.

23 Claims, 16 Drawing Sheets

(56) References Cited

U.S. PATENT DOCUMENTS

| | | |
|---|---|---|
| 2004/0233890 A1* | 11/2004 | Jou .............................. 370/350 |
| 2006/0209746 A1 | 9/2006 | Asai et al. |
| 2007/0042733 A1 | 2/2007 | Tomioka |
| 2007/0058758 A1 | 3/2007 | Ishii |
| 2007/0092045 A1 | 4/2007 | Woo et al. |
| 2007/0223332 A1 | 9/2007 | Fujinami et al. |
| 2008/0069275 A1 | 3/2008 | Horiguchi et al. |

FOREIGN PATENT DOCUMENTS

| | | |
|---|---|---|
| CN | 101145833 A | 3/2008 |
| JP | 2006-222665 A | 8/2006 |
| JP | 2007-082185 A | 3/2007 |
| JP | 2008-072646 A | 3/2008 |

OTHER PUBLICATIONS

Danijela Cabric, et al., "Implementation Issues in Spectrum Sensing for Cognitive Radios", IEEE, 2004, pp. 772-776.

Office Action dated Jan. 24, 2013, issued by the State Intellectual Property Office of the P.R.C. in counterpart Chinese Application No. 200980119795.5.

* cited by examiner

| FREQUENCY BAND FOR WHICH RADIO APPARATUS CAN PERFORM SEARCH f1-f5 | | | | | | | | |
|---|---|---|---|---|---|---|---|---|
| | PRIMARY SYSTEM INFORMATION | | | | SYSTEM SETTING PARAMETER | | | |
| No | USED FREQUENCY BAND OF PRIMARY SYSTEM | NAME | STANDARD | EXTRACTABLE FEATURE VALUE | USED FEATURE VALUE | FALSE ALARM RATE | NUMBER OF FEATURE VALUES TO BE USED | NUMBER OF NON-FEATURE VALUES TO BE USED |
| 1 | FREQUENCY BAND f1 | SYSTEM A | RADIO STANDARD A | FEATURE VALUE A | FEATURE VALUE A | 0.1 | 1 | 9 |
| | | | | | | 0.01 | 1 | 99 |
| 2 | FREQUENCY BAND f2 | SYSTEM B | RADIO STANDARD B | FEATURE VALUE B | FEATURE VALUE B | 0.1 | 1 | 9 |
| | | | | | | 0.05 | 1 | 19 |
| 3 | FREQUENCY BAND f3 | SYSTEM C | RADIO STANDARD C | FEATURE VALUES A,B,C | FEATURE VALUES B,C | 0.1 | 1 | 9 |
| 4 | CHANNEL A (f4-f5) | SYSTEM D | RADIO STANDARD D | FEATURE VALUE D | FEATURE VALUE D | 0.1 | 3 | 2 |

FIG. 16

COGNITIVE RADIO SYSTEM, COGNITIVE RADIO APPARATUS, AND RADIO SIGNAL DETECTION METHOD

TECHNICAL FIELD

This invention relates to a radio apparatus and a radio communication system which recognize a surrounding radio environment, and more particularly, to a technology of recognizing a surrounding radio environment, which is employed for a radio apparatus.

BACKGROUND ART

In cognitive radio, which is a radio communication system in which parameters used for radio communication are changed adaptively according to a surrounding radio environment, the parameters are optimized according to the radio environment by recognizing the surrounding radio environment (detecting a radio signal). In particular, in a frequency band allocated to another radio communication system (hereinafter, referred to as primary system), if a cognitive radio system uses the frequency band in a shared manner as a secondary system, use efficiency of the frequency band improves.

When the secondary system uses the frequency band in a shared manner with the primary system, the secondary system tries not to affect existing services provided by the primary system. In order to avoid interference to the primary system, the secondary system needs to use a frequency band that is not being used by the primary system, or needs to perform such communication that produces an interference amount equal to or smaller than an amount allowed by the primary system. In other words, the secondary system needs to accurately identify a status of frequency band usage of the primary system before using the frequency band.

As a specific method of detecting whether or not a signal of the primary system exists in a frequency band used by the primary system (frequency band that the secondary system intends to use), there is known spectrum sensing, which is means used by a secondary system radio apparatus for detecting a radio signal in its surrounding. The spectrum sensing is broadly divided into the following methods. That is, a method using energy detection, in which a determination is made based on the amount of received signal power obtained through time averaging (energy detection), and a method in which a feature value contained in a transmitted signal of the primary system is used for detection (feature detection).

IEEE 802.22 is one example of the radio communication system in which detection of the primary system is performed through the above-mentioned spectrum sensing and the secondary system uses a frequency band that is not being used by the primary system. With IEEE 802.22, the standardization of wireless regional area network (WRAN) systems using the frequency band allocated to the U.S. TV broadcast has been discussed. According to IEEE 802.22, in a case where the received power of a signal compliant with Advanced Television Systems Committee (ATSC), which is a standard for the U.S. TV broadcast, is equal to or larger than −116 dBm, a misdetection rate and a false alarm rate are each defined to be set to 0.1 or smaller.

Here, the misdetection rate refers to a probability of determining that a searched frequency band is in an unoccupied state despite a fact that a signal of the primary system exists. The false alarm rate refers to a probability of determining that a signal of the primary system exists despite a fact that a searched frequency band is in an unoccupied state. The misdetection of a signal of the primary system leads to interference to the primary system, and the false alarm results in decreased frequency use efficiency.

FIG. 1 is a diagram illustrating, as an example, relation between the secondary system radio apparatus using the spectrum sensing and the primary system.

FIG. 1 illustrates a primary system radio apparatus 100 performing transmission, a primary system radio apparatus 110 performing reception, and a secondary system radio apparatus 200 that identifies a status of frequency band usage through the spectrum sensing. Further, a reference received power area 10 represents an area in which the misdetection rate and the false alarm rate of the secondary system radio apparatus 200 need to be controlled to predetermined values or smaller with regard to the detection of the primary system. Specifically, as illustrated in FIG. 1, in a case where the secondary system radio apparatus 200 is located within the reference received power area, the secondary system radio apparatus 200 is required to reduce the misdetection rate and the false alarm rate as much as possible, and also to control those rates to the predetermined values or smaller, by reliably detecting a signal transmitted from the primary system radio apparatus 100.

Further, also in cognitive radio communication systems other than the above-mentioned WRAN systems, similarly to the WRAN systems, it is necessary to protect the primary system against interference from the secondary system, and to keep high the frequency use efficiency of a used frequency band. Therefore, it is necessary for the secondary system to set the misdetection rate and the false alarm rate of the secondary system to the predetermined values or smaller with respect to a signal having a higher level than reference received power.

In order to set the misdetection rate and the false alarm rate to the predetermined values or smaller, various methods of detecting the primary system have been proposed. Among those methods, as a detection method in which a feature value contained in the transmitted signal of the primary system is used for detection, there are a method using cyclostationarity of a signal transmitted from the primary system, a method using cyclicity contained in the transmitted signal or a frame format, a method in which the secondary system radio apparatus prepares the same sequence as a pilot signal sequence of a received signal to examine correlation with the received signal, and the like.

For example, Patent Document 1 discloses a spectrum sensing method in which the chi-square test is performed using the cyclostationarity of a signal transmitted from the primary system. In this method, a cyclic autocorrelation value, which is a feature value reflecting the cyclostationarity, is generated and then compared with a threshold that is set in advance, to thereby determine whether or not a signal of the primary system exists. Further, the threshold is determined based on a chi-square distribution according to the false alarm rate set in the secondary system radio apparatus. A characteristic thereof is that the threshold can be determined only with the set value of the false alarm rate independently of noise power and interference power, and hence there is no need to estimate the noise power or the interference power. Further, by adjusting an averaging time required to generate the cyclic autocorrelation value, the misdetection rate can be set to the set value or smaller in an area having power equal to or larger than reference received power.

Other technologies are described in Patent Document 2, Patent Document 3, Non-patent Document 1, and the like. The cyclicity contained in the transmitted signal or the frame format, which is used in the spectrum sensing method of Patent Document 2, also exists in an OFDM signal using a cyclic prefix, and hence it is possible to detect the OFDM signal by using the method of Patent Document 2. Further, by using the same characteristic as the cyclicity of the cyclic prefix employed in Patent Document 2, as described in Patent Document 3, an application to blind estimation of an effective symbol length and a guard interval length, which are parameters of the OFDM signal, is also possible.

Patent Document 1: Japanese Unexamined Patent Application Publication (JP-A) No. 2006-222665

Patent Document 2: US Unexamined Patent Application Publication (US-A1) No. 2007/0092045

Patent Document 3: Japanese Unexamined Patent Application Publication (JP-A) No. 2007-082185

Non-patent Document 1: D. Cabric, S. M. Mishra, R. W. Brodersen, "Implementation issues in spectrum sensing for cognitive radios," the Thirty-Eighth Asilomar Conference on Signals, Systems and Computers (November, 2004)

DISCLOSURE OF THE INVENTION

Problem to be Solved by the Invention

However, further improvement is necessary for the detection method in which the feature value contained in the transmitted signal of the primary system is used for detection.

Specifically, the chi-square test of Patent Document 1 is a method limited to the spectrum sensing method that uses the cyclostationarity. Accordingly, it is impossible to use such feature values that are useful for the detection of the primary system, including a correlation characteristic of the pilot signal transmitted from the primary system, the cyclicity of the transmitted signal or the frame format of the primary system, and the like.

An object of this invention is to provide a cognitive radio system, a cognitive radio apparatus, and a spectrum sensing method, which are capable of detecting the primary system with high accuracy by using the feature value of the transmitted signal of the primary system and a non-feature value that does not reflect a typical feature of the primary system, which are useful for the detection of the primary system.

Another object of this invention is to provide a cognitive radio system, a cognitive radio apparatus, and a spectrum sensing method, which are capable of satisfying the set false alarm rate by using the feature value of the transmitted signal of the primary system and the non-feature value that does not reflect the typical feature of the primary system, which are useful for the detection of the primary system.

Another object of this invention is to provide a cognitive radio system, a cognitive radio apparatus, and a spectrum sensing method, which are capable of reducing the misdetection rate by using the feature value of the transmitted signal of the primary system and the non-feature value that does not reflect the typical feature of the primary system, which are useful for the detection of the primary system.

Means to Solve the Problem

A cognitive radio system according to this invention includes: a memory which stores a system parameter and a pseudo parameter, the system parameter being used for generation of a feature value specific to a radio system for which a search is performed, the pseudo parameter being similar to the system parameter; a feature value generator which generates one or a plurality of the feature values based on a signal in a received frequency band by using the system parameter; a non-feature value generator which generates one or a plurality of non-feature values based on the signal in the received frequency band by using the pseudo parameter; and a determination section which determines whether or not a signal of the radio system exists by using the one or the plurality of the feature values and the one or the plurality of non-feature values.

A cognitive radio apparatus according to this invention includes: a memory which stores a system parameter and a pseudo parameter, the system parameter being used for generation of a feature value specific to a radio system for which a search is performed, the pseudo parameter being similar to the system parameter; a feature value generator which generates one or a plurality of the feature values based on a signal in a received frequency band by using the system parameter; a non-feature value generator which generates one or a plurality of non-feature values based on the signal in the received frequency band by using the pseudo parameter; and a determination section which determines whether or not a signal of the radio system exists by using the one or the plurality of the feature values and the one or the plurality of non-feature values.

A radio signal detection method according to this invention includes: receiving a radio signal in a frequency band for which a search is performed; generating one or a plurality of feature values by using a signal in a received frequency band and a system parameter of a radio system for which the search is performed; generating one or a plurality of non-feature values by using the signal in the received frequency band and a pseudo parameter similar to the system parameter; and determining whether or not a signal of the radio system exists by using the one or the plurality of feature values and the one or the plurality of non-feature values.

Effect of the Invention

According to this invention, it is possible to provide the cognitive radio system, the cognitive radio apparatus, and the spectrum sensing method, which are capable of detecting the primary system with high accuracy by using the feature value of the transmitted signal of the primary system and the non-feature value that does not reflect the typical feature of the primary system, which are useful for the detection of the primary system.

BRIEF DESCRIPTION OF THE DRAWINGS

FIG. 16 is an explanatory diagram illustrating, as an example, a frequency band for which a search can be performed, information on an extractable feature value for each radio system used in the frequency band, and relevant information, which are recorded in association with one another in a memory.

DESCRIPTION OF EMBODIMENT

Figure 1:
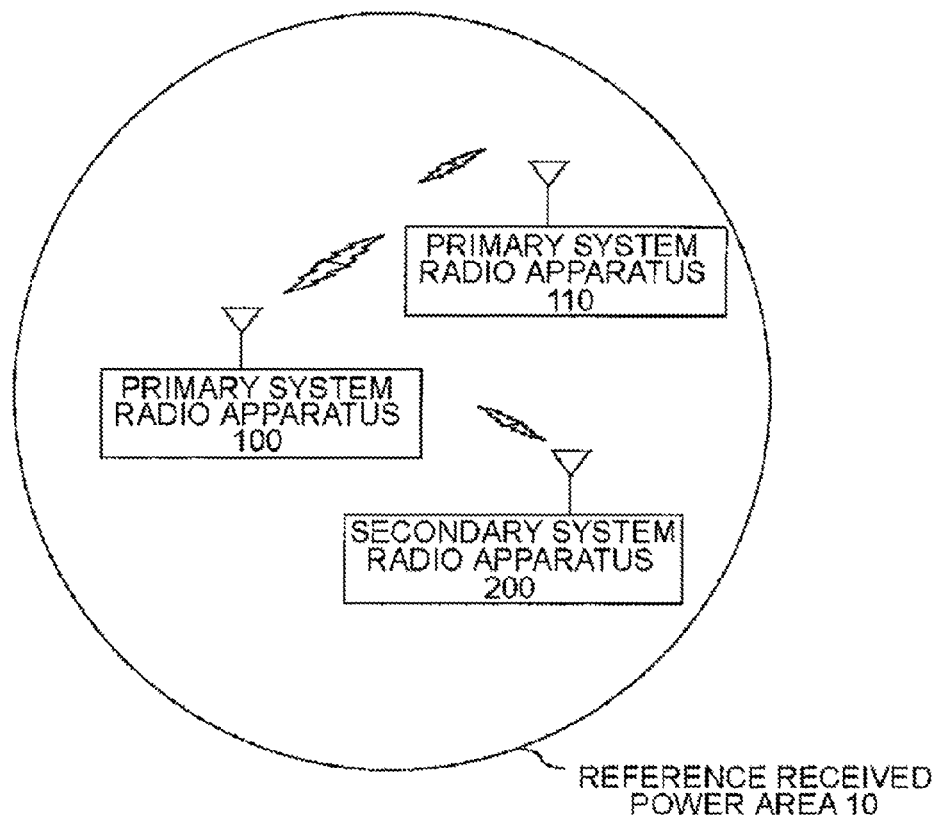
FIG. 1 is a diagram illustrating, as an example, relation between a secondary system radio apparatus using spectrum sensing and a primary system.
Figure 2:
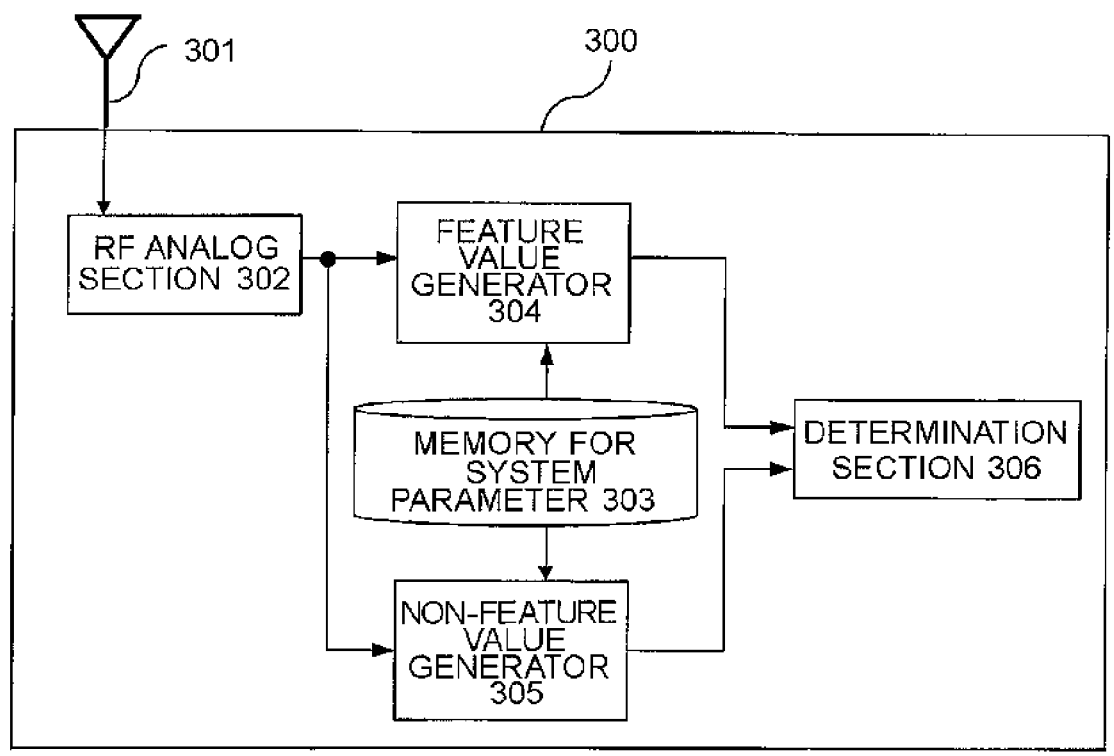
FIG. 2 is a functional block diagram of a secondary system radio apparatus according to a first embodiment.
Figure 3:
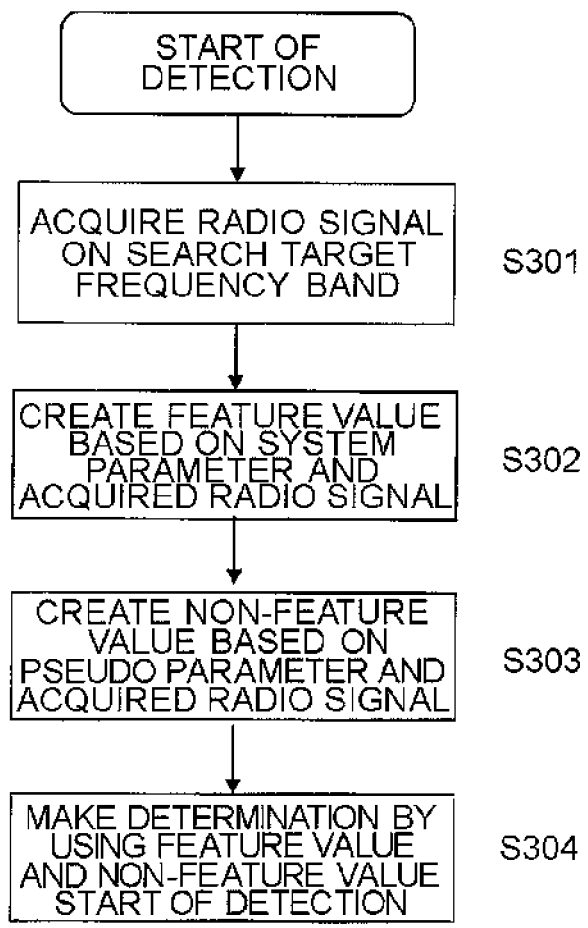
FIG. 3 is a flow chart illustrating detection operation of the secondary system radio apparatus according to the first embodiment.

Detailed description is given of a first embodiment of this invention with reference to FIG. 2 and FIG. 3.

FIG. 2 is a functional block diagram of a secondary system radio apparatus 300 according to this embodiment. It should be noted that description of specifics that are of little relevance to this invention is omitted for clarity of description.

The secondary system radio apparatus 300 includes: an antenna 301 for receiving transmitted signals (radio waves) of a primary system; a radio frequency (RF) analog section 302 for extracting a signal in a desired frequency band from the signals received by the antenna 301; a memory for system parameter 303 for storing a system parameter of the primary system, which is used for generating a feature value specific to the primary system, and a pseudo parameter that is similar to the system parameter; a feature value generator 304 for generating the feature value based on the received signal and the system parameter; a non-feature value generator 305 for generating a non-feature value, which does not reflect typical features of the primary system, based on the received signal and the pseudo parameter; and a determination section 306 for determining whether or not a signal of the primary system exists.

The memory for system parameter 303 is formed of any one of a read only memory (ROM), a random access memory (RAM), and a hard disk drive (HDD), which are commonly-used storage devices, or a combination thereof. The memory for system parameter 303 stores the system parameter, which corresponds to the feature value specific to the primary system for which a search is performed, and the pseudo parameter, which is a parameter similar to the system parameter and used for generating the non-feature value.

Here, description is given of relation between the feature value and the non-feature value.

The feature value is a value obtained by quantifying a typical feature of a communication scheme or a frame format which is used in a search target primary system. The feature value is generated by the feature value generator 304 using a signal in the received frequency band and the system parameter. The system parameter used in the communication scheme or the frame format of the primary system is reflected to the feature value, and hence the feature value has such a property that the feature value is large in a case where a radio signal of the search target primary system exists in a searched frequency band (in a case where a characteristic radio signal is detected).

The non-feature value is a value generated so that, in a case where no radio signal of the search target primary system exists in the searched frequency band, the non-feature value has the same probability distribution as that of the above-mentioned feature value, and that, in the case where a radio signal of the primary system exists, the non-feature value is kept small.

The non-feature value is generated by the non-feature value generator 305 using the radio signal in the received frequency band and the pseudo parameter stored in the memory for system parameter 303. In generating the non-feature value, the pseudo parameter, which is similar to but different from the system parameter used in the generation processing for the feature value, is used instead of the system parameter.

Here, in the course of the generation processing for the non-feature value, the pseudo parameter is used as described above, and hence, even in the case where a radio signal of the primary system exists, there is provided such a property that the value of the non-feature value is kept small.

In a case where no radio signal of the primary system exists and the received signal is formed of noise components and/or interference components, the feature value and the non-feature value are generated in the same manner, to thereby provide the feature value and the non-feature value with a property of having the same probability distribution. Further, when the feature value and the non-feature value have the same probability distribution, the feature value and the non-feature value are substantially the same value.

Specifically, in a case where the feature value is large, there is a high probability that the primary system is transmitting a radio signal. On the other hand, if the feature value and the non-feature value are substantially the same value, this means that there is a high probability that the primary system is not transmitting a radio signal.

Accordingly, by comparing the feature value and the non-feature value, and determining, in the case where the feature value is larger, that the primary system exists, it is possible to detect the primary system.

In addition, by setting in advance the numbers of feature values and non-feature values to be generated, it is possible to detect the primary system with a false alarm rate set to a desired value.

Specifically, in a case where only one feature value can be generated, the number of the non-feature values to be generated is set to N−1 (N: an integer equal to or larger than 2), and then, in a case where the feature value is the largest value among the feature value and N−1 non-feature values, it is determined that the primary system exists. Thus, it is possible to detect the primary system with the false alarm rate set to 1/N.

For example, in a case where the false alarm rate is set to 0.1, the setting in the secondary system radio apparatus is made to satisfy N=10, to thereby generate one feature value and nine non-feature values. Then, in a case where the feature value is the largest value thereof, it is determined that the primary system exists. On the other hand, in a case where any one of the non-feature values is the largest value, it is determined that the primary system does not exist. Similarly, in a case where the false alarm rate is set to 0.01, the setting in the secondary system radio apparatus may be made to satisfy N=100, to thereby generate one feature value and ninety-nine non-feature values for the determination processing.

Further, in a case where a plurality of feature values can be generated, by performing the detection of the primary system in the following manner, it is possible to set the false alarm rate to a desired value and reduce a misdetection rate compared with the detection of the primary system in which only one feature value is used. In other words, in order to reduce the misdetection rate at the time of detecting the primary system, it is effective to increase the number of feature values to be used for the determination. Specifically, according to a desired value of the misdetection rate, a combination of the type of the feature value and the number of feature values, which are to be used for the determination in the determination section 306, is adjusted for the determination processing, and hence it is possible to reduce the misdetection rate while maintaining the desired value of the false alarm rate.

In the case where a plurality of feature values can be generated, the number of feature values to be generated is set to n, and the number of non-feature values to be generated is set to N−n (N: an integer equal to or larger than (n+1)). Among the generated feature values and non-feature values, m values are selected in descending order, and in a case where all the m values are the feature values, it is determined that the primary system exists. In a case where the non-feature value is among the m values, it is determined that the primary system does not exist. On this occasion, compared with the detection of the primary system in which the false alarm rate is set using one feature value, the false alarm rate may be set to $_nC_m/_NC_m$, and it is possible to detect the primary system while reducing the misdetection rate.

For example, in a case where three feature values can be generated, if the detection of the primary system is performed by the secondary system radio apparatus in which the false alarm rate is set to 0.1, the number of feature values to be generated is set to 3 (=n), and the number of non-feature values to be generated is set to 2 (=N−n: that is, N=5). Then, three (=m) values are selected in descending order among the generated feature values and non-feature values. In this case, through the above-mentioned determination processing, the false alarm rate becomes the desired value, that is, $_3C_3/_5C_3$=0.1, and also, it is possible to detect the primary system with a reduced misdetection rate compared with the detection of the primary system in which the false alarm rate is set using one feature value.

In summary, by setting in advance the numbers of feature values and non-feature values to be generated, it is possible to detect the primary system with a desired false alarm rate achieved in the determination section 306.

Next, detection operation of the secondary system radio apparatus 300 is described.

FIG. 3 is a flow chart illustrating the detection operation of the secondary system radio apparatus 300 according to this embodiment.

In the RF analog section 302, radio signals in the frequency band for which a search is performed are input via the antenna 301, and a signal in the desired frequency band is received and then output to the feature value generator 304 and the non-feature value generator 305 (Step S301).

The feature value generator 304 acquires the system parameter from the memory for system parameter 303, and then generates one or a plurality of feature values by using the system parameter and the signal input from the RF analog section 302. The feature value generator 304 outputs the generated feature value to the determination section 306 (Step S302).

The non-feature value generator 305 acquires the pseudo parameter from the memory for system parameter 303, and then generates one or a plurality of non-feature values by using the pseudo parameter and the signal input from the RF analog section 302. The non-feature value generator 305 outputs the generated non-feature value to the determination section 306 (Step S303).

The determination section 306 makes a comparison as to which of the input feature value and the input non-feature value is larger, and determines that a signal of the primary system exists in a case where the feature value is larger. Further, in a case where the non-feature value is larger, the determination section 306 determines that no signal of the primary system exists (Step S304).

By operating as described above, the secondary system radio apparatus 300 of this embodiment can detect a signal of the primary system with high accuracy.

In addition, by setting the number of feature values to be generated by the feature value generator 304 and the number of non-feature values to be generated by the non-feature value generator 305 according to a desired false alarm rate, it is possible to detect the primary system with the desired false alarm rate achieved. In the same manner, if the determination processing is performed by increasing the number of feature values to be generated by the feature value generator 304, it is possible to detect the primary system with a reduced misdetection rate.

Next, detailed description is given of a second embodiment of this invention with reference to the drawings.

In this embodiment, at the time of detecting the primary system, a control signal (control channel) used by the primary system is used as the feature value.

For example, there is used a pilot signal, which is inserted in the transmitted signal of the primary system for such purposes as timing synchronization, channel estimation, and frequency offset estimation. Hereinafter, for clarity of description, detection of the primary system in which only one type of the pilot signal is used is described. It should be noted that the method of this embodiment is also applicable to a case where a plurality of types of pilot signals are available. Further, if a plurality of types of pilot signals are used, in addition to setting the false alarm rate, it is possible to reduce the misdetection rate.

Figure 4:
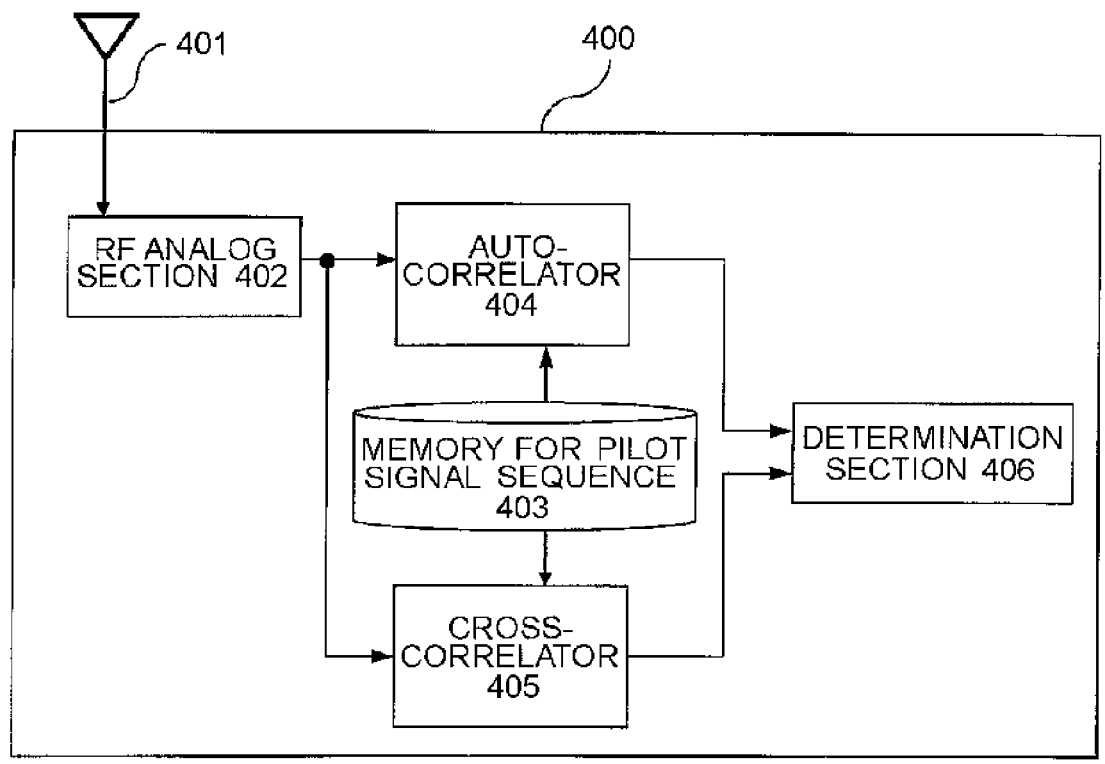
FIG. 4 is a functional block diagram of a secondary system radio apparatus according to a second embodiment.

FIG. 4 is a functional block diagram of a secondary system radio apparatus 400 according to this embodiment. It should be noted that description of specifics that are of little relevance to this embodiment is omitted.

The secondary system radio apparatus 400 includes: an antenna 401 for receiving transmitted signals (radio waves) of the primary system; an RF analog section 402 for extracting a signal in a desired frequency band from the signals received by the antenna 401 to convert the signal to a baseband signal; a memory for pilot signal sequence 403 for storing a pilot signal sequence used in the primary system and a plurality of signal sequences having little correlation with the pilot signal sequence, such as pseudo-random signal sequences; an autocorrelator 404 for correlating the baseband signal and the pilot signal sequence to generate a value as the feature value; a cross-correlator 405 for correlating the baseband signal and the pseudo-random signal sequence to generate a value as the non-feature value; and a determination section 406 for determining whether or not a signal of the primary system exists.

Figure 5:
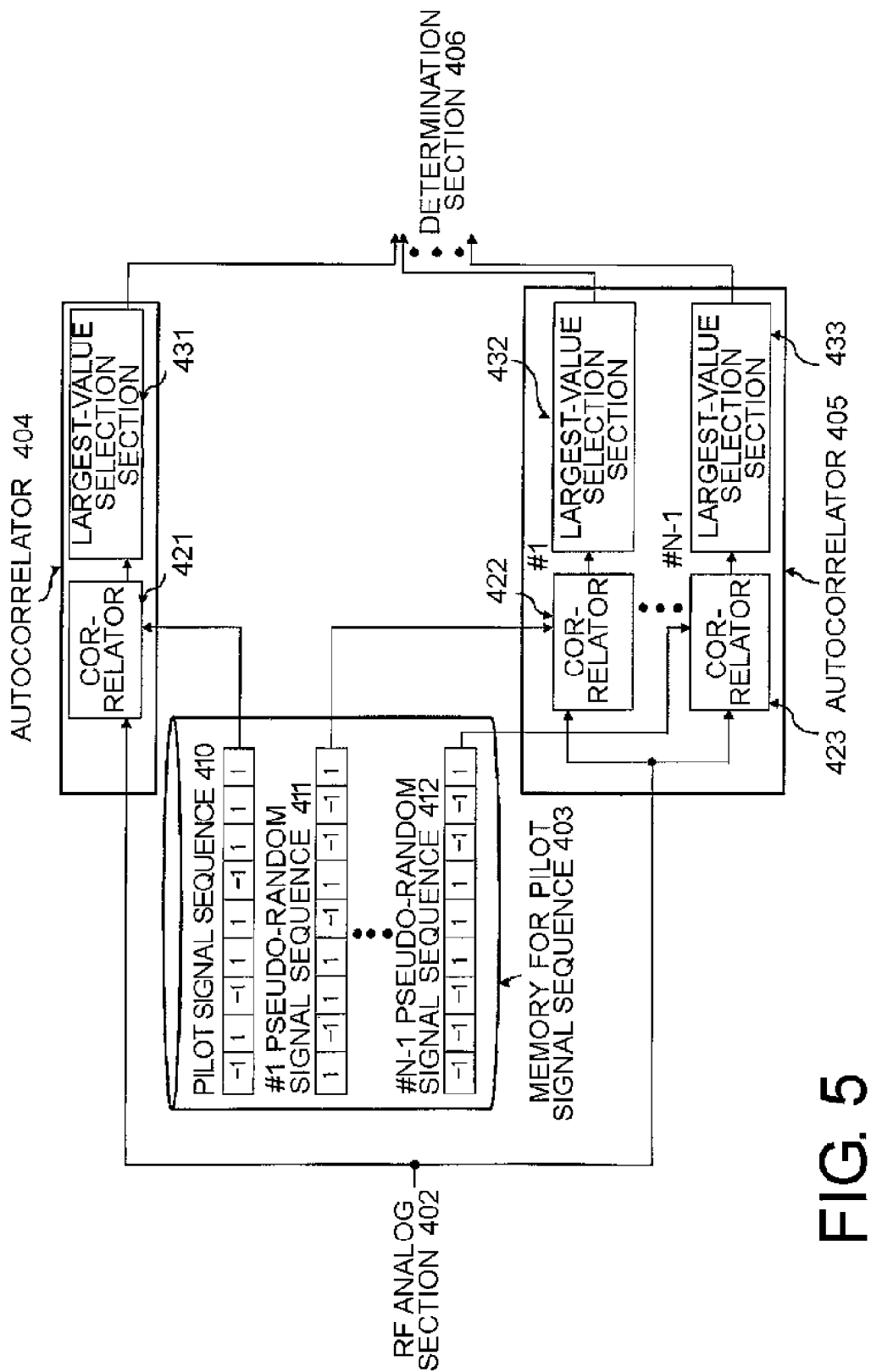
FIG. 5 is a functional block diagram illustrating in more detail a memory for pilot signal sequence, an autocorrelator, and a cross-correlator.

FIG. 5 is a block diagram illustrating in more detail the memory for pilot signal sequence 403, the autocorrelator 404, and the cross-correlator 405.

In the memory for pilot signal sequence 403, there are stored a pilot signal sequence 410, which is a sequence specific to the primary system for which a search is performed, and pseudo-random signal sequences (only 411 and 412 are illustrated in FIG. 5), which have the same length (same bit length) as that of the pilot signal sequence 410 and have little correlation with the pilot signal sequence 410. There are N−1 pseudo-random signal sequences, each of which is used to generate the non-feature value.

The autocorrelator 404 includes a correlator 421 and a largest-value selection section 431. The cross-correlator 405 includes N−1 correlators (only 422 and 423 are illustrated) and N−1 largest-value selection sections (only 432 and 433 are illustrated).

Next, detection operation of the secondary system radio apparatus 400 illustrated in FIG. 4 is described.

Via the antenna 401 and the RF analog section 402, a radio wave of the frequency band for which a search is performed is input, and the baseband signal in the desired frequency band is detected and then output to the autocorrelator 404 and the cross-correlator 405.

In the autocorrelator 404, the baseband signal supplied from the RF analog section 402 is input to the correlator 421, and the correlator 421 calculates one or a plurality of correlations by using the pilot signal sequence 410 acquired from the memory for pilot signal sequence 403. Next, the correlations calculated by the correlator 421 are input to the largest-value selection section 431, and a correlation having the largest value is selected as the feature value from among the plurality of correlations. Further, the selected feature value is input to the determination section 406.

On this occasion, the correlator 421 calculates the correlations between the baseband signal and the pilot signal sequence 410 while shifting a timing to start correlation calculation within a predetermined search time window. In other words, correlation values corresponding to a plurality of start times are respectively calculated.

The above-mentioned search time window is determined according to the frame format of the transmitted signal of the primary system for which a search is performed. For example, in a case where the transmitted signal of the primary system exists and the pilot signal sequence is inserted cyclically to the transmitted signal, a cycle with which the pilot signal sequence is inserted is set as the search time window.

By selecting the search time window as described above, the correlator 421 can calculate correlations so that the calculated correlations always contain a correlation of a timing at which the pilot signal sequence contained in the baseband signal and the pilot signal sequence 410 prepared in advance are in temporal synchronization.

Simultaneously with the calculation processing for the correlations using the pilot signal sequence 410 and the selection processing for the feature value, which are performed in the autocorrelator 404, in the cross-correlator 405, there are performed calculation processing for correlations based on the pseudo-random signal sequence and selection processing for the non-feature value.

In the cross-correlator 405, the baseband signal supplied from the RF analog section 402 is input to the correlator 422, and the correlator 422 calculates correlations by using the pseudo-random signal sequence 411 acquired from the memory for pilot signal sequence 403.

Next, the plurality of correlations calculated by the correlator 422 are input to the largest-value selection section 432, and a correlation having the largest value is selected from among the plurality of correlation values as the non-feature value. Further, the selected non-feature value is input to the determination section 406.

Other correlators (423 and the like) and largest-value selection sections (433 and the like) than the correlator 422 and the largest-value selection section 432 of the cross-correlator 405 operate in the same manner as the correlator 422 and the largest-value selection section 432 by using the pseudo-random signal sequences (412 and the like) acquired from the memory for pilot signal sequence 403.

Each of the correlators (422 and the like) of the cross-correlator 405 calculates a plurality of correlations between the pseudo-random signal sequence 411 or the like and the baseband signal while shifting the timing to start the correlation calculation within the search time window used in the correlator 421. After that, a total of N−1 non-feature values, which are output from the respective largest-value selection sections (433 and the like) of the cross-correlator 405, are input to the determination section 406.

In the determination section 406, the largest value is selected from among the feature value and the non-feature values, which are input from the autocorrelator 404 and the cross-correlator 405 in a total number of N. In a case where the feature value input from the autocorrelator 404 is the largest value of the N values, the determination section 406 determines that a signal of the primary system exists. Further, in a case where any one of the N−1 non-feature values generated by the cross-correlator 405 is the selected value, the determination section 406 determines that no signal of the primary system exists and that the frequency band is in an unoccupied state.

With the operation described above, in the case of detecting a signal of the primary system, the secondary system radio apparatus 400 of this embodiment can perform such detection that satisfies the desired false alarm rate determined by the set number of N.

In this embodiment, in the case where a signal of the primary system exists, because the correlations between the baseband signal and the pilot signal sequence used in the primary system are calculated while shifting the timing to start the correlation calculation, the largest feature value is acquired in the autocorrelator 404 in a case where the pilot signal sequence contained in the baseband signal and the prepared pilot signal sequence are in temporal synchronization. By utilizing this characteristic, the detection of the primary system is performed.

Specifically, in the case where a signal of the primary system exists, the feature value generated using the pilot signal sequence in the autocorrelator 404 is larger than the non-feature value generated using the pseudo-random signal sequence in the cross-correlator 405, and hence the primary system can be detected.

On the other hand, in the case where no signal of the primary system exists, the received signal is formed only of noise components or interference components, and hence the feature value generated by the autocorrelator 404 and the N−1 non-feature values generated by the cross-correlator 405 all have the same probability distribution.

In this case, a probability that the feature value obtained using the pilot signal sequence 410 and input from the autocorrelator 404 is the largest in the determination section 406 is 1/N, and hence the false alarm rate is 1/N.

For example, in a case where the false alarm rate is set to 0.1 to perform the detection of the primary system, one feature value is selected in the autocorrelator 404, nine non-feature values are selected in the cross-correlator 405, and the largest value is selected in the determination section 406. If the number of values to be generated is set as described above, N=10 is satisfied, and hence the false alarm rate is set to the desired value, that is, 0.1.

In summary, by setting N in advance, it is possible to detect the primary system with the false alarm rate constantly set to the desired value (1/N) without the need to estimate noise power and interference power.

Next, detailed description is given of a third embodiment of this invention with reference to the drawings.

In this embodiment, at the time of detecting the primary system, cyclicity with which the same signal is repeated within the transmitted signal of the primary system is used as the feature value.

For example, at the time of detecting the primary system, there is used a cyclic prefix used in orthogonal frequency division multiplexing (OFDM) or single carrier-frequency division multiple access (SC-FDMA), a pilot signal inserted continuously or repeatedly at fixed intervals, or the like.

It should be noted that the "cyclicity" in this embodiment refers to a fact that the same signal is used repeatedly within the transmitted signal of the primary system. Further, a cyclic time refers to a time interval with which the same signal is used repeatedly.

Figure 6:
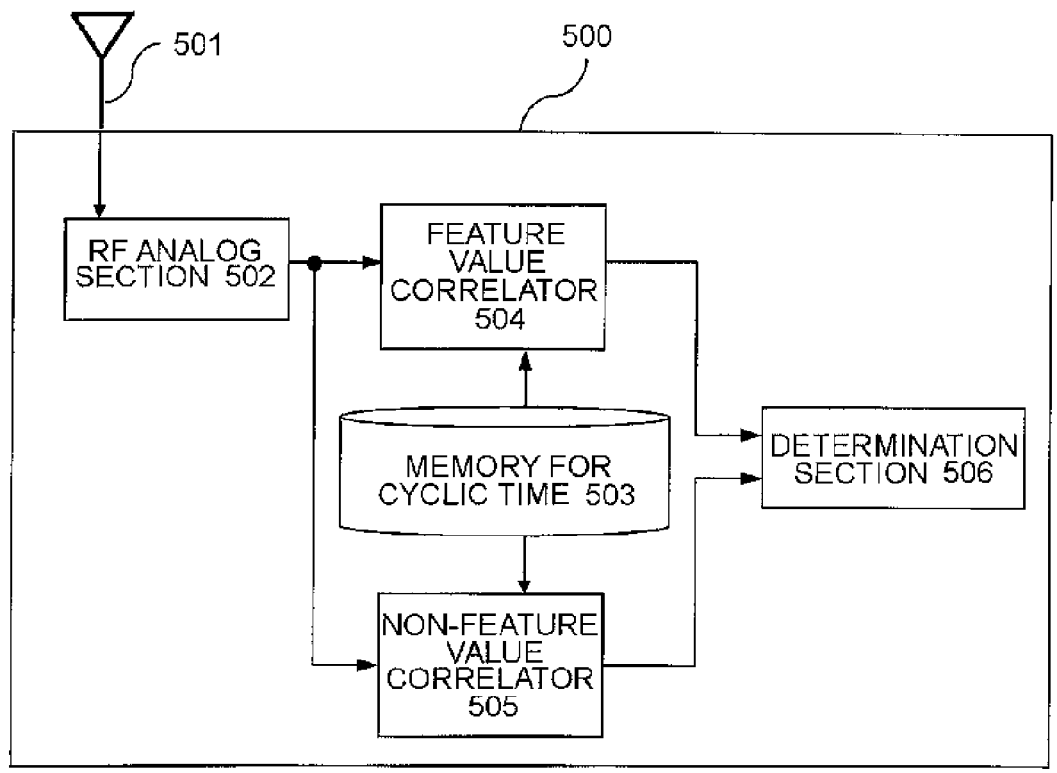
FIG. 6 is a functional block diagram of a secondary system radio apparatus according to a third embodiment.

FIG. 6 is a functional block diagram of a secondary system radio apparatus 500 according to a third embodiment.

The secondary system radio apparatus 500 includes: an antenna 501 for receiving transmitted signals (radio waves) of the primary system; an RF analog section 502 for extracting an RF signal in a desired frequency band from the signals received by the antenna; a memory for cyclic time 503 for storing the cyclic time of the transmitted signal of the primary system and an acyclic time showing no cyclicity; a feature value correlator 504 for generating the feature value specific to the transmitted signal of the primary system by using the cyclic time; a non-feature value correlator 505 for generating a plurality of non-feature values by using the acyclic time; and a determination section 506 for determining whether or not a signal of the primary system exists.

Figure 7:
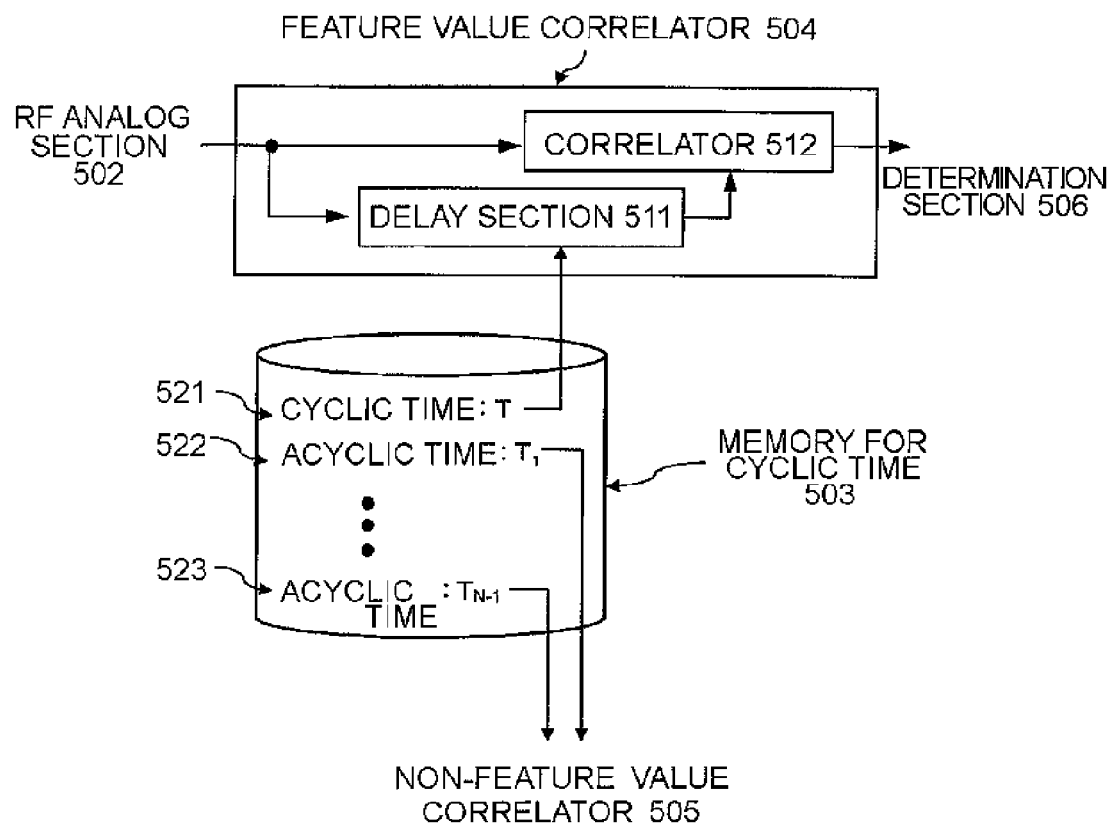
FIG. 7 is a functional block diagram illustrating in more detail a memory for cyclic time and a feature value correlator.

In the memory for cyclic time 503, there are stored a time T 521, which is a cyclic time specific to the primary system for which a search is performed, and acyclic times (only 522 and 523 are illustrated in FIG. 7). There are N-1 acyclic times, each of which is used to generate the non-feature value.

The feature value correlator 504 includes a delay section 511 and a correlator 512. The non-feature value correlator 505 includes N-1 delay sections and N-1 correlators.

Here, in the RF analog section 502, the received signal is used as an RF signal, but the secondary system radio apparatus 500 may convert the received signal to an intermediate frequency (IF) signal or a baseband signal, and may process such a signal in the same manner as in the case of the RF signal. Hereinafter, for clarity of description, the case of using the received signal as the RF signal is described.

Next, operation of the secondary system radio apparatus 500 is described with reference to FIG. 7. It should be noted that, for simplicity of description, operation of the feature value correlator 504 is described, and description of detailed operation of the non-feature value correlator 505 is omitted.

FIG. 7 is a functional block diagram illustrating in more detail the memory for cyclic time 503 and the feature value correlator 504.

In the secondary system radio apparatus 500, first, via the antenna 501 (not shown) and the RF analog section 502 (not shown), a radio signal of the frequency band for which a search is performed is output to the feature value correlator 504 and the non-feature value correlator 505 (not shown) as the RF signal in the desired frequency band.

In the feature value correlator 504, the RF signal supplied from the RF analog section 502 is input to the delay section 511 and the correlator 512. In the delay section 511, the input RF signal is delayed by the cyclic time 521 acquired from the memory for cyclic time 503, to thereby generate a delayed signal. The delayed signal thus acquired is correlated with the original RF signal in the correlator 512, and then, the generated feature value is input to the determination section 506. It should be noted that the generation processing for the feature value is described later in detail.

Simultaneously with the generation processing for the feature value performed in the feature value correlator 504, in the non-feature value correlator 505, the non-feature values are generated based on the RF signal and the delayed signal. On this occasion, as the delay time used in the non-feature value correlator 505, the acyclic time (522, 523) stored in the memory for cyclic time 503 is used. In the non-feature value correlator 505, based on the acyclic times $T_1$ to $T_{N-1}$ different from the cyclic time T, a total of N-1 non-feature values are generated, and are then transmitted to the determination section 506.

In the determination section 506, the largest value is selected from among the feature value and the non-feature values, which are input from the feature value correlator 504 and the non-feature value correlator 505 in a total number of N. In a case where the feature value input from the feature value correlator 504 is the largest value of the N values, the determination section 506 determines that a signal of the primary system exists. Further, in a case where any one of the N-1 non-feature values generated by the non-feature value correlator 505 is the selected value, the determination section 506 determines that no signal of the primary system exists and that the frequency band is in an unoccupied state.

With the operation described above, in the case of detecting a signal of the primary system, the secondary system radio apparatus 500 of this embodiment can perform such detection that satisfies the desired false alarm rate determined by the set number of N.

Figure 8:
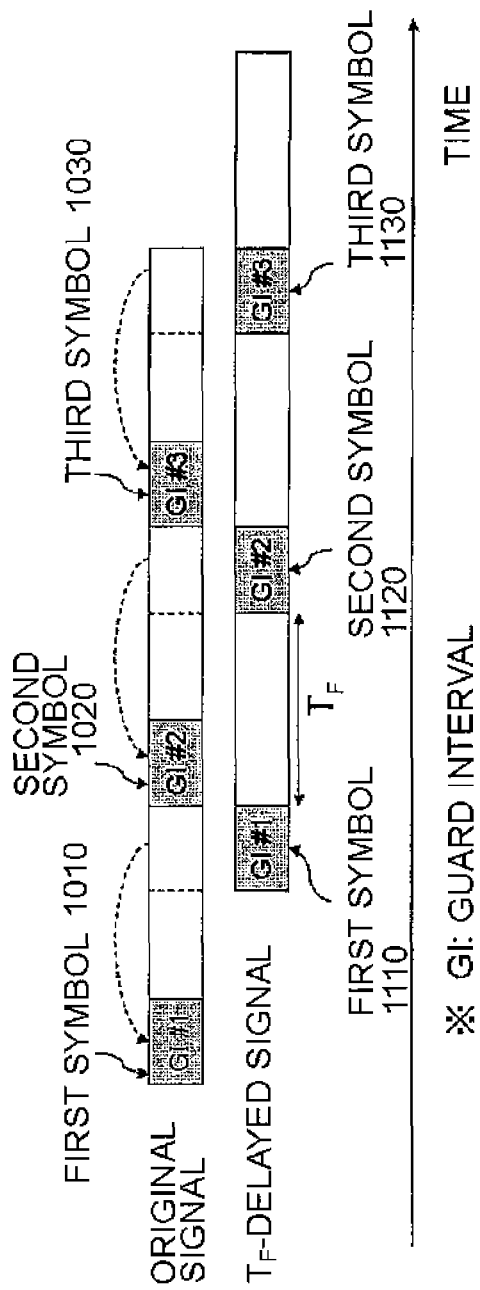
FIG. 8 is a diagram illustrating an acquired OFDM signal and a delayed OFDM signal.

Next, with reference to FIG. 8, detailed description is given of feature value generation processing for a signal having cyclicity, which is performed in the correlator 512, by taking as an example the case of an OFDM signal. It should be noted that non-feature value generation processing that is performed by using the acyclic time in the correlator provided to the non-feature value correlator 505 is also performed in the same manner as described below.

FIG. 8 is a diagram illustrating an acquired OFDM signal and a delayed OFDM signal. In this figure, the horizontal axis represents time, and the vertical axis represents the types of OFDM signals having different delay times.

In FIG. 8, a time $T_F$ represents an effective symbol length of the OFDM signal. In a normal OFDM signal, as illustrated in FIG. 8, a cyclic prefix, which is a copy of the latter part of each OFDM symbol, is inserted in a guard interval (GI) part.

In view of this, if the OFDM signal is delayed by the time $T_F$, which is the effective symbol length, the copy source of the cyclic prefix of the original signal temporally coincides with the guard interval part of the $T_F$-delayed signal, and hence correlation is generated.

Accordingly, in the secondary system radio apparatus 500 in which the cyclic prefix of the OFDM signal is used for detecting a signal of the primary system, in the case where a signal of the primary system exists, a high correlation value generated due to the cyclicity of the cyclic prefix of the OFDM signal is generated as the feature value in the correlator 512 of FIG. 7.

Further, in the case of the OFDM signal, in generating the correlation, a section in which the copy source of the cyclic prefix and the guard interval part of the delayed signal temporally coincide with each other (hereinafter, referred to as GI coincidence section) is generated for every OFDM symbol length (total time of the GI and the effective symbol length). Hence, in the correlator 512, a correlation obtained by extracting only a plurality of GI coincidence sections that contribute to the correlation and combining the extracted sections may be used as the feature value.

It should be noted that, because it is impossible to know at what time (point) of the received signal the GI coincidence section starts, only correlations of portions expected to be the GI coincidence sections are extracted and combined at some candidate start points, to thereby generate feature value candidates that are generated only with the GI coincidence sections, and select the largest value from among those candidates.

In the correlator 512, the largest value selected through the above-mentioned method may be used as the correlation, and, with this method, it is possible to eliminate unnecessary signal components from the correlation calculation. It should be noted that, in this case, the same correlation calculation method is used also in the correlation calculation that is performed by the non-feature value correlator 505 using acyclic time delay.

Here, as for the delay value (cyclic time, acyclic time) used for the generation, for example, in the case of IEEE 802.11 a using the OFDM transmission, the effective symbol length is defined as 3.2 μs, and the guard interval length is defined as 0.8 μs. Hence, the effective symbol length of 3.2 μs serves as the cyclic time as described above. Further, as the acyclic time, times other than the cyclic time, that is, 3.2 μs, may be used, including 0.8 μs, 1.6 μs, 2.4 μs, 4.0 μs, 4.8 μs, 5.6 μs, and 6.4 μs.

Figure 9:
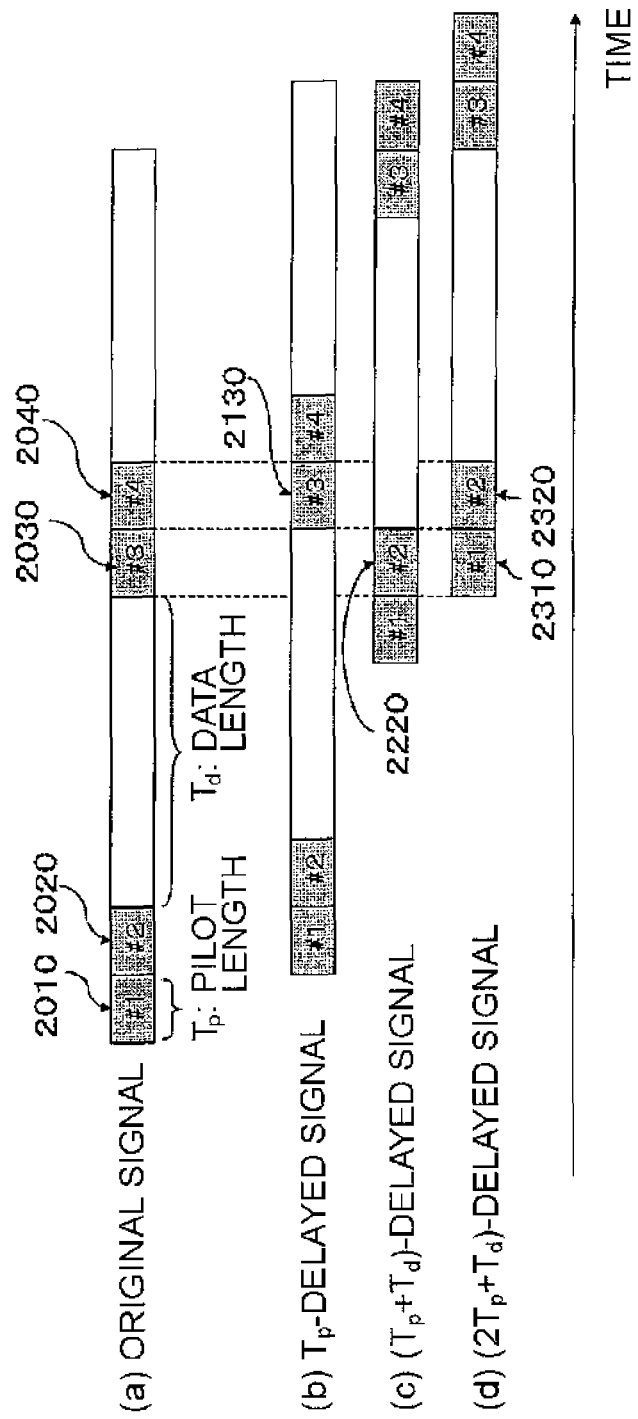
FIG. 9 is a diagram illustrating signals in which a pilot signal sequence is inserted continuously and cyclically.

Next, description is given of correlations of signals having a plurality of cyclic times in the correlator 512, by taking as an example a pilot signal of FIG. 9.

FIG. 9 is a diagram illustrating signals in which the pilot signal sequence is inserted continuously and cyclically. In this figure, the horizontal axis represents time, and the vertical axis represents the types of delayed signals obtained by delaying the original signal by a plurality of different delay times.

The original signal has one unit formed by combining two identical pilot signal sequences each having a length of $T_p$ and a data sequence having a length of $T_d$, and this unit is repeated to form the signal. Accordingly, pilot signal sequences #1 to #4 (2010, 2020, 2030, and 2040) are all the same signal sequences.

In the case of the above-mentioned signal, various delay times may be used as the cyclic times for generating the feature values. In a case where the original signal and a $T_p$-delayed signal are correlated, the pilot signal sequence #4 (2040) of the original signal and the pilot signal sequence #3 (2130) of the $T_p$-delayed signal temporally coincide with each other.

In the same manner, in the case of correlating the original signal and a $(T_p+T_d)$-delayed signal, the pilot signal sequence #3 (2030) of the original signal and the pilot signal sequence #2 (2220) of the $(T_p+T_d)$-delayed signal temporally coincide with each other.

In the same manner, in the case of correlating the original signal and a $(2T_p+T_d)$-delayed signal, the pilot signal sequence #3 (2030) of the original signal temporally coincides with the pilot signal sequence #1 (2310) of the $(2T_p+T_d)$-delayed signal, and the pilot signal sequence #4 (2040) of the original signal temporally coincides with the pilot signal sequence #2 (2320) of the $(2T_p+T_d)$-delayed signal.

With those temporal coincidence sections, correlations between the original signal and the delayed signals are generated. Accordingly, in the case where a signal of the primary system exists, by using such delayed signals that have the delay times thereof set to $T_p$, $(T_p+T_d)$, $(2T_p+T_d)$, and the like, it is possible to generate the feature values based on the correlations generated due to the cyclicity of the pilot signal.

It should be noted that, similarly to the case of the OFDM signal described above with reference to FIG. 8, in the correlator 512, it is possible to perform such correlation calculation that only the sections in which the pilot signal sequences coincide with each other are extracted.

Further, in the above description of FIG. 7, only one cyclic time is used to generate the feature value in the feature value correlator 504. However, as in the example described with reference to FIG. 9, in a case where a plurality of cyclic times can be set for a detection target radio signal, delay sections and correlators corresponding to the plurality of cyclic times may be provided to the feature value correlator 504, and a plurality of feature values may be output from the feature value correlator 504 for the use in the determination section 506.

In this embodiment, the cyclicity of the transmitted signal of the primary system is used, and, in a case where a transmitted signal having the cyclicity exists, the feature value generated by the feature value correlator 504 becomes large. By utilizing this characteristic, the detection of the primary system is performed.

In the case where a signal of the primary system exists, the feature value generated by the feature value correlator 504 is larger than the N−1 non-feature values generated by the non-feature value correlator 505, and hence it is determined that a signal of the primary system exists.

On the other hand, in the case where no signal of the primary system exists, the received signal is formed only of noise components or interference components, and hence the feature value generated by the feature value correlator 504 and the N−1 non-feature values generated by the non-feature value correlator 505 all have the same probability distribution.

In this case, a probability that the feature value input from the feature value correlator 504 is the largest in the determination section 506 is 1/N, and hence, by setting N, the false alarm rate may be set to 1/N. Further, a desired false alarm rate may be set in the secondary system radio apparatus to automatically calculate N in the secondary system radio apparatus, and the detection processing of the primary system may be performed using the calculated value.

For example, in the case where the false alarm rate is set to 0.1 to perform the detection of the primary system, one feature value is generated by the feature value correlator 504, nine non-feature values are generated by the non-feature value correlator 505, and the largest value is selected in the determination section 506. If the number of values to be generated is set as described above, N=10 is satisfied, and hence the false alarm rate is set to the desired value, that is, 0.1.

In summary, by setting N in advance, it is possible to detect the primary system with the false alarm rate constantly set to the desired value (1/N) without the need to estimate noise power and interference power.

It should be noted that, as described above, in the RF analog section 502, the same processing is possible even if the received signal is converted to the IF signal or the baseband signal instead of the RF signal. In a case where the IF signal or the baseband signal is used in the RF analog section 502, because those signals may be expressed by complex numbers, correlation values (feature value and non-feature values) generated through the correlation calculation in the feature value correlator 504 and the non-feature value correlator 505 may also be expressed by complex numbers. In this case, the determination section 506 selects a value having the largest real part or a value having the largest complex absolute value from among the feature value and the non-feature values which are input from the feature value correlator 504 and the non-feature value correlator 505 in a total number of N. The determination method performed in the determination section 506 after the selection of the largest value is the same between the case of using the RF signal and the case of using the IF signal or the baseband signal. According to whether the selected largest value is the feature value or the non-feature value, the determination section 506 determines whether or not a signal of the primary system exists.

Next, detailed description is given of a fourth embodiment of this invention with reference to the drawings.

This invention is also applicable to such detection of the primary system that uses cyclostationarity of the received signal. In this embodiment, the cyclostationarity is used as a feature of the transmitted signal of the primary system, to thereby detect the primary system.

First, the cyclostationarity is described. When a given signal is cyclostationary, this means that an autocorrelation function of the signal is a cyclic function. On this occasion, a cyclic autocorrelation function (CAF) of a baseband signal y(t), which is expressed by Expression 1, shows peaks cyclically.

$$R_y^\alpha(\tau) = \frac{1}{T}\sum_{t=0}^{T-1} y(t)y^*(t+\tau)e^{-j2\pi\alpha\Delta t}$$ (Expression 1)

Here, α represents a cyclic frequency. Further, T represents the number of samples used for averaging, Δ represents a sampling time, and τ represents the number of samples corresponding to a delay time for calculating a value of CAF. It should be noted that * represents complex conjugate.

Figure 10:
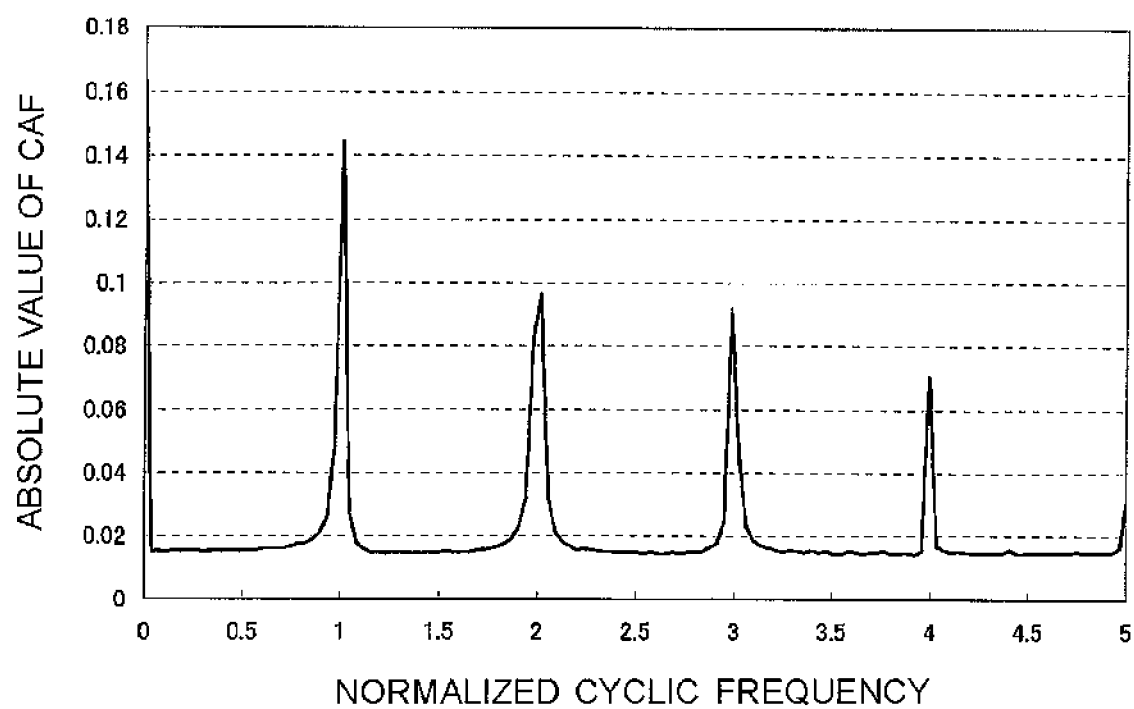
FIG. 10 is a graph illustrating, as an example, a cyclic autocorrelation function of a case where an OFDM signal is used as a signal y(t).

FIG. 10 illustrates a cyclic autocorrelation function of a case where a signal has the cyclostationarity. It should be noted that the horizontal axis represents the cyclic frequency normalized by a peak interval, and the vertical axis represents the absolute value of the cyclic autocorrelation function. The absolute value of the cyclic autocorrelation function is expressed by Expression 2.

$$|R_y^\alpha(\tau)|$$ (Expression 2)

FIG. 10 is a graph illustrating, as an example, the cyclic autocorrelation function of a case in which the OFDM signal is used as the signal y(t).

In the case of the OFDM signal, peaks are generated at cyclic frequencies having an interval of 1/Ts (Ts represents an OFDM symbol length combining the guard interval and the effective symbol length). Further, in the case of the OFDM signal, when τ is equal to the effective symbol length, the peak of the cyclic autocorrelation function becomes largest. As in this example, a cyclostationary signal has peaks generated in its cyclic autocorrelation function at the cyclic frequencies having a constant interval.

Hereinafter, a value of CAF obtained at a cyclic frequency at which the cyclic autocorrelation function reaches the peak is referred to as peak value of CAF, and a value of CAF obtained at a cyclic frequency at which the cyclic autocorrelation function does not reach the peak is referred to as non-peak value of CAF.

Figure 11:
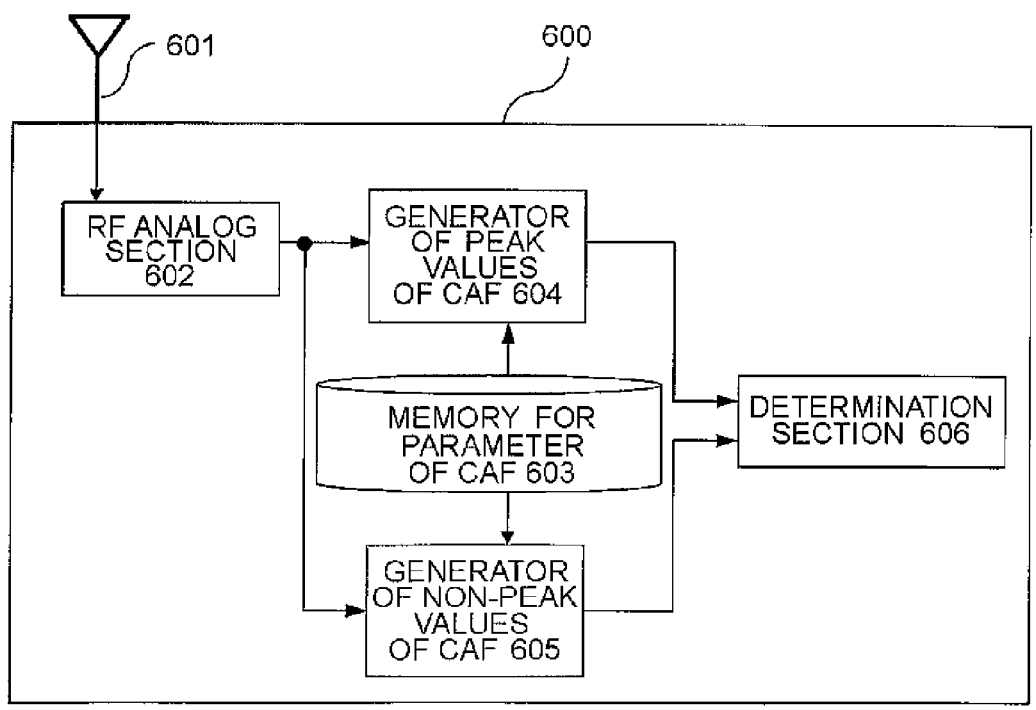
FIG. 11 is a functional block diagram of a secondary system radio apparatus according to a fourth embodiment.

FIG. 11 is a functional block diagram of a secondary system radio apparatus 600 according to a fourth embodiment.

The secondary system radio apparatus 600 includes: an antenna 601 for receiving the transmitted signals (radio waves) of the primary system; an RF analog section 602 for converting, of the signals received by the antenna, a signal in a desired frequency band to a baseband signal; a memory for the parameter of CAF 603 for storing the cyclic frequency and the delay time with which the cyclic autocorrelation function of the transmitted signal of the primary system reaches the peak and the cyclic frequency and the delay time with which the cyclic autocorrelation function does not reach the peak; a generator of peak values of CAF 604 for generating, as the feature value, a peak value of CAF based on the baseband signal by using the cyclic frequency and the delay time with which the cyclic autocorrelation function reaches the peak; a generator of non-peak values of CAF 605 for generating, as the non-feature value, a non-peak value of CAF based on the baseband signal by using the cyclic frequency and the delay time with which the cyclic autocorrelation function does not reach the peak; and a determination section 606 for determining whether or not a signal of the primary system exists.

Here, in the RF analog section 602, the received signal is converted to the baseband signal. However, in this embodiment, the received signal may be converted to an intermediate frequency (IF) signal, and the same processing as in the case of the baseband signal may be performed. Hereinafter, for clarity of description, the case of converting the received signal to the baseband signal is described.

Next, detection operation of the secondary system radio apparatus 600 is described.

In the secondary system radio apparatus 600, first, via the antenna 601 and the RF analog section 602, radio signals of the frequency band for which a search is performed are input, and a radio signal in the desired frequency band is converted to the baseband signal, which is then output to the generator of peak values of CAF 604 and the generator of non-peak values of CAF 605.

Hereinafter, description is given of operation of the generator of peak values of CAF 604, the generator of non-peak values of CAF 605, and the determination section 606 with reference to FIG. 12.

Figure 12:
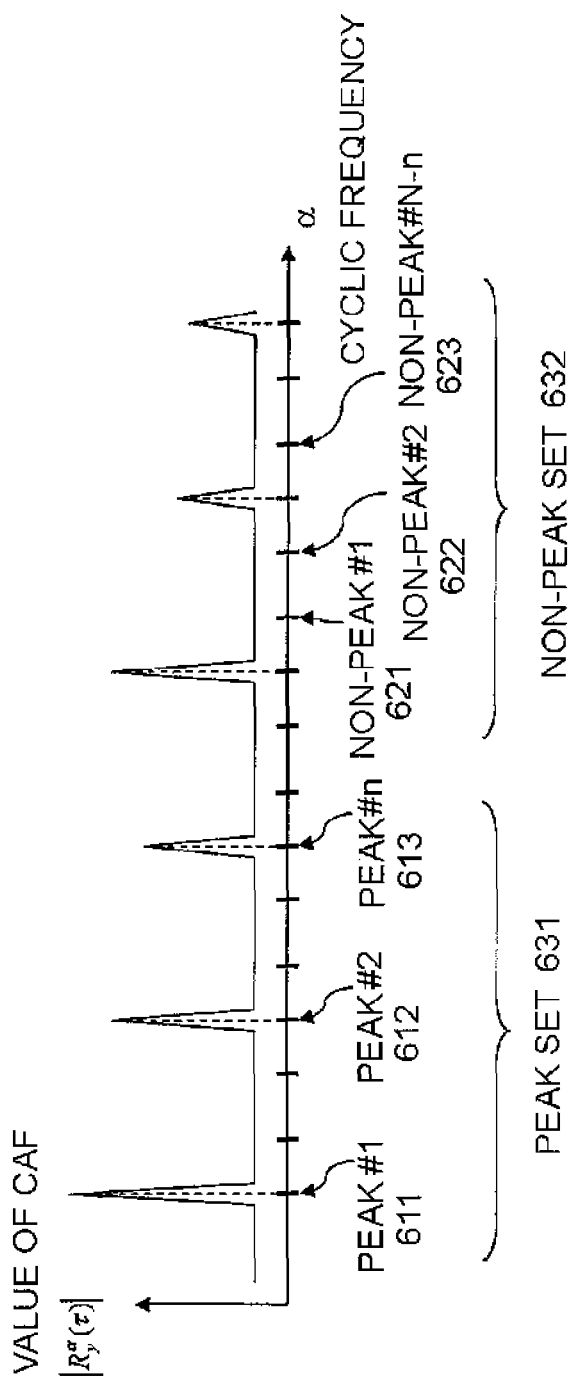
FIG. 12 is a graph illustrating, as an example, a cyclic autocorrelation function according to the fourth embodiment.

FIG. 12 is a graph illustrating, as an example, a cyclic autocorrelation function according to this embodiment. In FIG. 12, the horizontal axis represents the cyclic frequency, and the vertical axis represents the value of CAF (absolute value).

The generator of peak values of CAF 604 acquires, from the memory for the parameter of CAF 603, the cyclic frequency and the delay time with which the cyclic autocorrelation function of the transmitted signal of the primary system reaches the peak, generates n peak values of CAF (peak #1 (611) and the like of FIG. 12) by using the acquired cyclic frequency and delay time and the baseband signal input from the RF analog section 602, and transmits the absolute values thereof to the determination section 606.

It should be noted that, in FIG. 12, a set of cyclic frequencies used by the generator of non-peak values of CAF 605, at which the cyclic autocorrelation function does not reach the peak, is referred to as non-peak set 632. The generator of non-peak values of CAF 605 transmits, to the determination section 606, the absolute values of N−n non-peak values of CAF obtained at the respective cyclic frequencies of the non-peak set 632.

Next, the determination section 606 selects m (provided m≤n) values in descending order of the absolute value from among the peak values of CAF and the non-peak values of CAF which are input in a total number of N. In a case where all of the selected m values of CAF are the peak values of CAF selected from a peak set 631, the determination section 606 determines that a signal of the primary system exists. Further, in a case where the selected m values of CAF contain a value selected from the non-peak values of CAF obtained at the cyclic frequencies of the non-peak set 632, it is determined that no signal of the primary system exists and that the frequency band is in an unoccupied state.

With the operation described above, in the case of detecting a signal of the primary system, the secondary system radio apparatus 600 of this embodiment can perform such detection that satisfies a desired false alarm rate determined by set numbers of n, m, and N.

In this embodiment, the cyclostationarity of the transmitted signal of the primary system is used, and, in the case where the transmitted signal exists, n peak values of CAF generated by the generator of peak values of CAF 604 become large. By utilizing this characteristic, the detection of the primary system is performed.

In the case where a signal of the primary system exists, n peak values of CAF generated by the generator of peak values of CAF 604 are larger than N−n non-peak values of CAF generated by the generator of non-peak values of CAF 605. Accordingly, there is a high probability that the peak values of CAF are selected as the m values of CAF by the determination section 606. Therefore, it is possible to detect the primary system.

On the other hand, in the case where no signal of the primary system exists, the received signal is formed only of noise components or interference components, and hence n peak values of CAF generated by the generator of peak values of CAF 604 and N−n non-peak values of CAF generated by the generator of non-peak values of CAF 605 all have the same probability distribution. Accordingly, a probability that all of the m values of CAF selected in the determination section 606 are peak value elements of CAF obtained at the cyclic frequencies of the peak set 631 is ${}_nC_m/{}_NC_m$ (C represents a combination), and thus the false alarm rate is ${}_nC_m/{}_NC_m$.

For example, in a case where three (=n) peak values of CAF are generated by the generator of peak values of CAF 604, in order to perform such detection of the primary system that the false alarm rate is set to 0.1, the number of peak values of CAF to be generated by the generator of peak values of CAF 604 is set to 3, and the number of non-peak values of CAF to be generated by the generator of non-peak values of CAF 605 is set to 2 (=N−n: that is, N=5). Then, from among a total of five generated values of CAF, three (=m) largest values are selected. In this case, through the above-mentioned determination processing performed in the determination section 606, it is possible to detect the primary system with the false alarm rate set to the desired value, that is, ${}_3C_3/{}_5C_3=0.1$.

In summary, by setting in advance n, m, and N described above, it is possible to detect the primary system with the false alarm rate set constant (${}_nC_m/{}_NC_m$) without the need to estimate noise power and interference power.

Next, detailed description is given of a fifth embodiment of this invention with reference to the drawings.

In this embodiment, similarly to the fourth embodiment, the cyclostationarity of the transmitted signal of the primary system is used, but there is a difference from the fourth embodiment in the feature value used at the time of determining whether or not a signal of the primary system exists.

Figure 13:
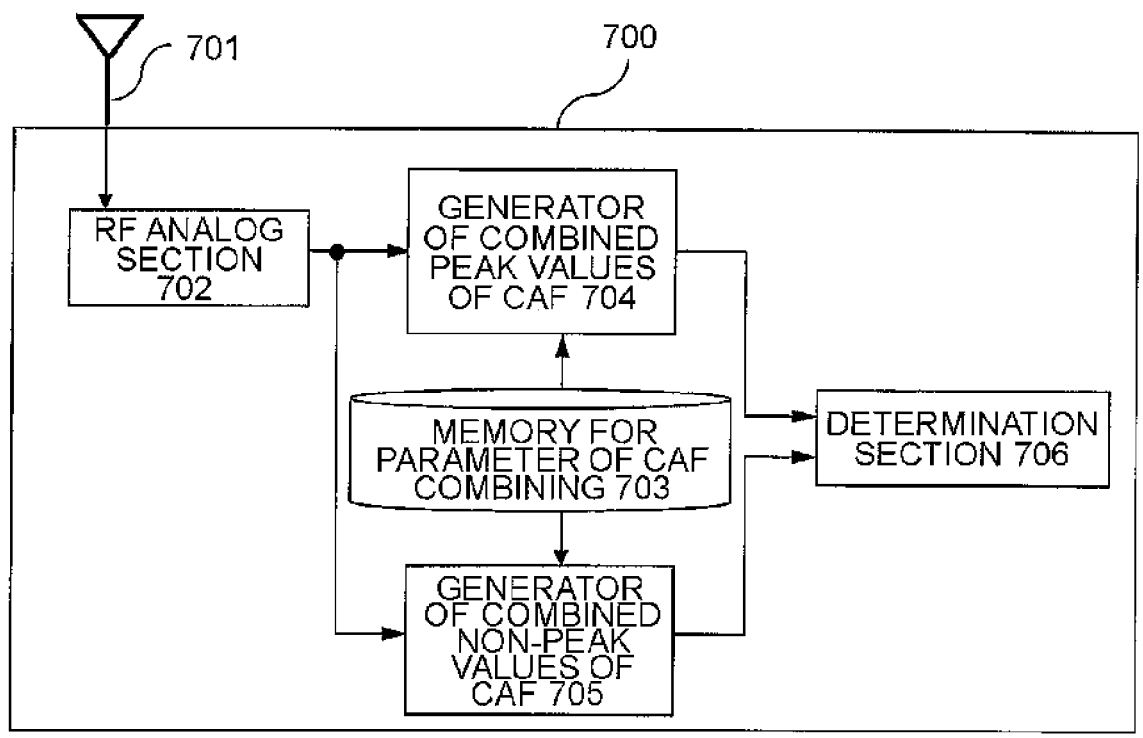
FIG. 13 is a functional block diagram of a secondary system radio apparatus according to a fifth embodiment.

FIG. 13 is a functional block diagram of a secondary system radio apparatus 700 according to a fifth embodiment.

The secondary system radio apparatus 700 includes: an antenna 701 for receiving the transmitted signals (radio waves) of the primary system; an RF analog section 702 for converting, of the signals received by the antenna, a signal in a desired frequency band to a baseband signal; a memory for the parameter of CAF combining 703 for storing the cyclic frequency and the delay time with which the cyclic autocorrelation function of the transmitted signal of the primary system reaches the peak, a replica of the value of CAF of the transmitted signal, which is obtained at that cyclic frequency and with that delay time, and the cyclic frequency and the delay time with which the cyclic autocorrelation function does not reach the peak; a generator of combined peak values of CAF 704 for generating, based on the baseband signal, a combined peak value of CAF as the feature value by using the cyclic frequency and the delay time with which the cyclic autocorrelation function reaches the peak and the replica of the value of CAF; a generator of combined non-peak values of CAF 705 for generating, based on the baseband signal, a combined non-peak value of CAF as the non-feature value by using the cyclic frequency and the delay time with which the cyclic autocorrelation function does not reach the peak and the replica of the value of CAF; and a determination section 706 for determining whether or not a signal of the primary system exists.

Here, in the RF analog section 702, the received signal is converted to the baseband signal. However, in this embodiment, the received signal may be converted to an intermediate frequency (IF) signal, and the same processing as in the case of the baseband signal may be performed. Hereinafter, for clarity of description, the case of converting the received signal to the baseband signal is described.

Next, detection operation of the secondary system radio apparatus 700 is described.

In the secondary system radio apparatus 700, first, via the antenna 701 and the RF analog section 702, radio signals of the frequency band for which a search is performed are input, and a radio signal in the desired frequency band is converted to the baseband signal, which is then output to the generator of combined peak values of CAF 704 and the generator of combined non-peak values of CAF 705.

Hereinafter, description is given of operation of the generator of combined peak values of CAF 704, the generator of combined non-peak values of CAF 705, and the determination section 706 with reference to FIG. 14.

Figure 14:
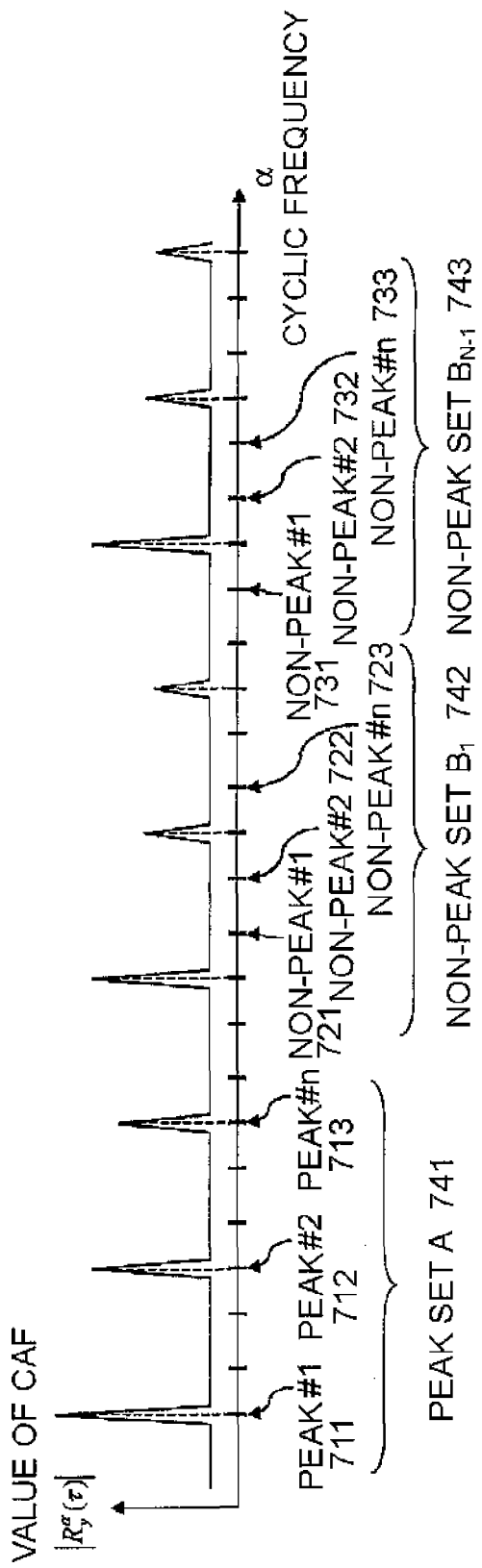
FIG. 14 is a graph illustrating, as an example, a cyclic autocorrelation function according to the fifth embodiment.

FIG. 14 is a graph illustrating, as an example, a cyclic autocorrelation function according to this embodiment.

The generator of combined peak values of CAF 704 acquires, from the memory for the parameter of CAF combining 703, the cyclic frequency and the delay time with which the cyclic autocorrelation function of the transmitted signal of the primary system reaches the peak, and then generates n peak values of CAF (peak #1 (711) and the like of FIG. 14) by using the acquired cyclic frequency and delay time and the baseband signal input from the RF analog section 702.

In FIG. 14, a set of cyclic frequencies at which the cyclic autocorrelation function generated by the generator of combined peak values of CAF 704 reaches the peak is illustrated as a peak set A 741. The generator of combined peak values of CAF 704 acquires the replicas of the values of CAF from the memory for the parameter of CAF combining 703, performing complex weighting with the acquired replicas of the values of CAF and combining of the generated n peak values of CAF obtained at the cyclic frequencies of the peak set A 741, and generates a combined peak value of CAF D shown in Expression 3.

$$D = \sum_{k=1}^{n} \hat{R}_x^{\alpha_k}(\tau)^* R_y^{\alpha_k}(\tau) \qquad \text{(Expression 3)}$$

Here, $R_y^{\alpha_k}(\tau)$ represents the peak value of CAF at each cyclic frequency $\alpha_k$ in the peak set A 741 generated based on the baseband signal. Further, $\hat{R}_x^{\alpha_k}(\tau)$ represents the replica of the value of CAF. It should be noted that, as the replica of the value of CAF, a value calculated in advance is stored in the memory for the parameter of CAF combining 703.

The generator of combined peak values of CAF 704 transmits the combined peak value of CAF thus generated to the determination section 706.

Next, description is given of operation of the generator of combined non-peak values of CAF 705. First, from the memory for the parameter of CAF combining 703, the cyclic frequency and the delay time with which the cyclic autocorrelation function does not reach the peak (non-peak #1 (721) and the like) are acquired, and then, the non-peak value of CAF is generated by using the acquired cyclic frequency and delay time and the baseband signal input from the RF analog section 702.

In FIG. 14, N−1 sets of cyclic frequencies at which the peak does not occur are defined, and are set as non-peak sets (only $B_1$ 742 and $B_{N-1}$ 743 are illustrated). Further, each of the non-peak sets has n cyclic frequencies as its elements.

The generator of combined non-peak values of CAF 705 generates, for each non-peak set, the non-peak values of CAF obtained at the cyclic frequencies in the non-peak set, and performs the complex weighting with the replicas of the values of CAF and combining of the generated non-peak values of CAF, to thereby generate the combined non-peak value of CAF. A combined non-peak value of CAF $D_m$ of a non-peak set $B_m$ (1≤m≤N−1) is generated with an expression shown as Expression 4.

$$D_m = \sum_{k=1}^{n} \hat{R}_x^{\alpha_k}(\tau)^* R_y^{\beta_k}(\tau) \qquad \text{(Expression 4)}$$

Here, as the replica of the value of CAF $\hat{R}_x^{\alpha_k}(\tau)$ to be used for the complex weighting and combining, the same replica as is used in the generator of combined peak values of CAF 704 is used. Further, $R_y^{\beta_k}(\tau)$ represents the non-peak value of CAF at the cyclic frequency $\beta_k$ in the non-peak set $B_m$.

Further, in order to reduce the amount of calculation required for generation of the n combined non-peak values of CAF, the following Expression 5 may be used instead of the combined non-peak value of CAF obtained with Expression 4.

$$D_m = R_y^{\beta_n} \sqrt{\frac{T'}{T} \sum_{k=1}^{n} \left| \hat{R}_x^{\alpha_k}(\tau) \right|^2} \qquad \text{(Expression 5)}$$

Here, T' represents the number of averaged samples used for generation of the non-peak value of CAF at the cyclic frequency $\beta_n$ in the non-peak set $B_m$. Expression 5 can be generated with one non-peak value of CAF, and is corrected with a coefficient so as to comply with the same probability distribution as in the case of Expression 4. It should be noted that, as the cyclic frequency used in Expression 5 for generation of the non-peak value of CAF, a cyclic frequency other than $\beta_n$ may be used as long as the cyclic frequency is contained in the non-peak set $B_m$.

The generator of combined non-peak values of CAF 705 generates the combined non-peak values of CAF for all of the non-peak sets, and then inputs a total of N−1 combined non-peak values of CAF to the determination section 706.

Next, the determination section 706 selects a value having the largest real part or a value having the largest complex absolute value from among the combined peak value of CAF and the N−1 combined non-peak values of CAF, which are input as above. In a case where the selected largest value is the combined peak value of CAF, the determination section 706 determines that a signal of the primary system exists. Further, in a case where the selected largest value is selected from the N−1 combined non-peak values of CAF, the determination section 706 determines that no signal of the primary system exists and that the frequency band is in an unoccupied state.

With the operation described above, in the case of detecting a signal of the primary system, the secondary system radio apparatus 700 of this embodiment can perform such detection that satisfies the desired false alarm rate.

In this embodiment, the cyclostationarity of the transmitted signal of the primary system is used.

In the case where the transmitted signal exists, because the replicas of the values of CAF are used as complex weights, and the peak values of CAF at the respective cyclic frequencies at which the cyclic autocorrelation function reaches the peak are subjected to the complex weighting and combining to generate the combined peak value of CAF, the phases of the peak values of CAF at the respective cyclic frequencies are made identical, which thus enables in-phase combining of the peak values of CAF. Therefore, in this embodiment, a signal power to noise power ratio (or signal to noise interference power ratio) may be improved, with a result that the combined peak value of CAF is increased.

Specifically, in the case where a signal of the primary system exists, the combined peak value of CAF is larger than the N−1 combined non-peak values of CAF generated by the generator of combined non-peak values of CAF 705, and hence it is possible to detect the primary system.

On the other hand, in the case where no signal of the primary system exists, the received signal is formed only of noise components or interference components, and hence the combined peak value of CAF and the N−1 combined non-peak values of CAF all have the same probability distribution, and a probability that the combined peak value of CAF is selected as the largest value is 1/N. Thus, the false alarm rate is 1/N.

Accordingly, for example, in the case where the false alarm rate is set to 0.1, by setting N to 10, one combined peak value of CAF and nine combined non-peak values of CAF are generated. In the case where the combined peak value of CAF is the largest value of the generated combined peak value of CAF and combined non-peak values of CAF, the determination section 706 determines that the primary system exists. In the case where any one of the combined non-peak values of CAF is the largest value thereof, the determination section 706 determines that the primary system does not exist.

In summary, by setting N in advance, it is possible to detect the primary system with the false alarm rate set constant (1/N) without the need to estimate noise power and interference power.

Next, detailed description is given of a sixth embodiment of this invention with reference to the drawings.

In this embodiment, by using the second embodiment to the fifth embodiment in combination, a detection rate of the primary system is improved. Hereinafter, as an example of the combination, description is given of detection of the primary system performed in combination of the third embodiment and the fifth embodiment, but other combinations are equally possible. It should be noted that the transmitted signal of the primary system is such a signal that has both the cyclicity and the cyclostationarity as is used in the third embodiment and the fifth embodiment.

Figure 15:
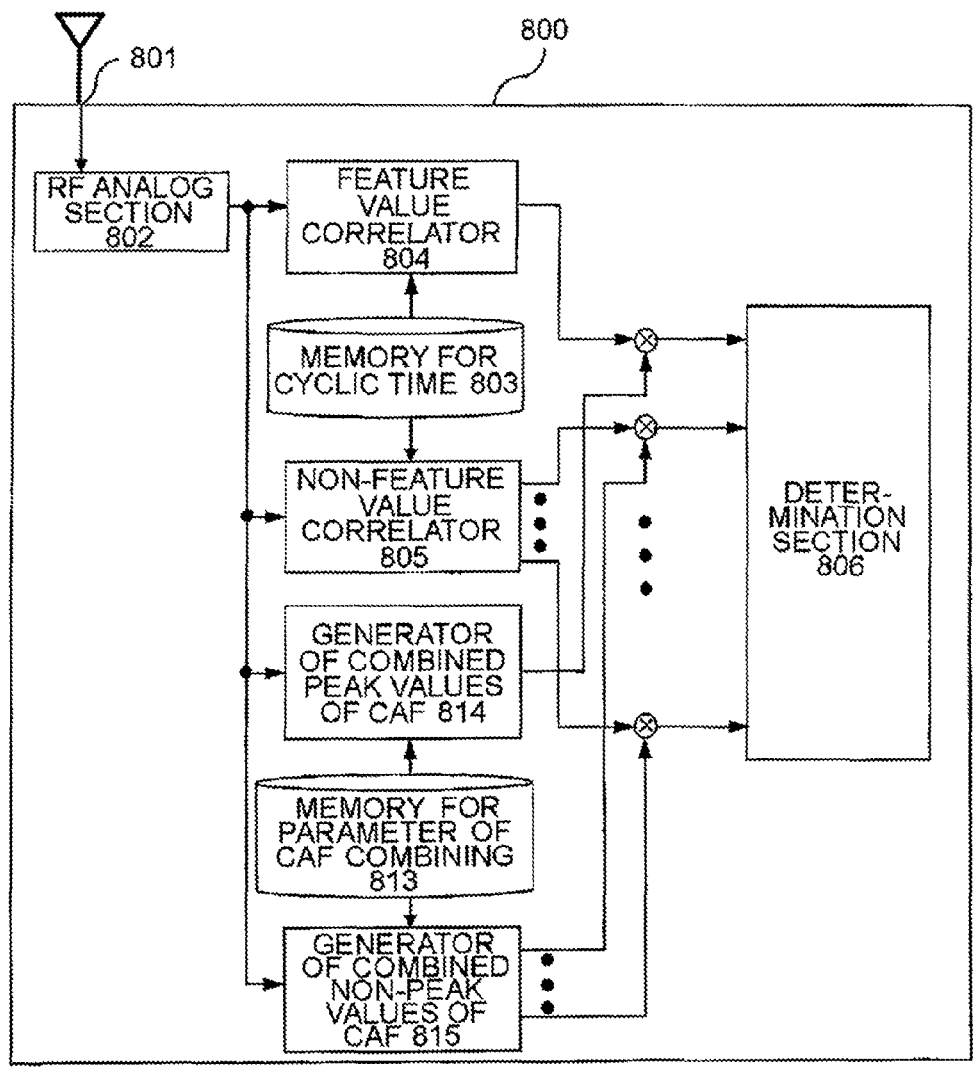
FIG. 15 is a functional block diagram of a secondary system radio apparatus according to a sixth embodiment.

FIG. 15 is a functional block diagram of a secondary system radio apparatus 800 according to a sixth embodiment.

The secondary system radio apparatus 800 includes: an antenna 801 for receiving the transmitted signals (radio waves) of the primary system; an RF analog section 802 for extracting an IF signal or a baseband signal in a desired frequency band from the signals received by the antenna; a memory for cyclic time 803 (identical to the memory for cyclic time 503) for storing the cyclic time of the transmitted signal of the primary system and the acyclic time showing no cyclicity; a feature value correlator 804 (identical to the feature value correlator 504) for generating the feature value specific to the transmitted signal of the primary system by using the cyclic time; a non-feature value correlator 805 (identical to the non-feature value correlator 505) for generating a plurality of non-feature values by using the acyclic time; a determination section 806 for determining whether or not a signal of the primary system exists; a memory for the parameter of CAF combining 813 (identical to the memory for the parameter of CAF combining 703) for storing the cyclic frequency and the delay time with which the cyclic autocorrelation function of the transmitted signal of the primary system reaches the peak, the replica of the value of CAF of the transmitted signal, which is obtained at that cyclic frequency and with that delay time, and the cyclic frequency and the delay time with which the cyclic autocorrelation function does not reach the peak; a generator of combined peak values of CAF 814 (identical to the generator of combined peak values of CAF 704) for calculating, based on the baseband signal, the combined peak value of CAF as the feature value by using the cyclic frequency and the delay time with which the cyclic autocorrelation function reaches the peak and the replica of the value of CAF; and a generator of combined non-peak values of CAF 815 (identical to the generator of combined non-peak values of CAF 705) for calculating, based on the baseband signal, the combined non-peak value of CAF as the non-feature value by using the cyclic frequency and the delay time with which the cyclic autocorrelation function does not reach the peak and the replica of the value of CAF.

Description of identical elements (memory for cyclic time 803, feature value correlator 804, non-feature value correlator 805, memory for the parameter of CAF combining 813, generator of combined peak values of CAF 814, and generator of combined non-peak values of CAF 815), which has been given above in the third embodiment and the fifth embodiment, is herein omitted.

To the determination section 806, a product of a value output from the feature value correlator 804 and a value output from the generator of combined peak values of CAF 814 is input as the feature value, and products of N−1 values output from the non-feature value correlator 805 and N−1 values output from the generator of combined non-peak values of CAF 815 are input as the non-feature values.

In the determination section 806, the largest value is selected from among the feature value and the non-feature values, which are input in a total number of N. In the case where the feature value is the largest value of the N values, the determination section 806 determines that a signal of the primary system exists. Further, in the case where the selected value is any one of the N−1 non-feature values, the determination section 806 determines that no signal of the primary system exists and that the frequency band is in an unoccupied state.

Here, in the description above, the product of the output values of the feature value correlator 804 and the generator of combined peak values of CAF 814, or the products of the output values of the non-feature value correlator 805 and the generator of combined non-peak values of CAF 815 are input to the determination section 806. However, the input values are not limited to products, and values obtained by addition with weighting may be used.

With the operation described above, in the case of detecting a signal of the primary system, the secondary system radio apparatus 800 of this embodiment can perform such detection that satisfies the desired false alarm rate.

Next, description is given of detection performed by the secondary system radio apparatus 800. In this embodiment, the cyclicity and the cyclostationarity of the transmitted signal of the primary system is used.

In the case where a signal of the primary system exists, both the values of the feature value correlator 804 and the generator of combined peak values of CAF 814 are large, which means that the feature value, which is the product of those output values, becomes even larger, and hence the feature value is larger than the N−1 non-feature values generated as the products of the non-feature value correlator 805 and the generator of combined non-peak values of CAF 815. Thus, it is possible to detect the primary system.

On the other hand, in the case where no signal of the primary system exists, the received signal is formed only of noise components or interference components, and hence the feature value and the N−1 non-feature values all have the same probability distribution.

In this case, a probability that the feature value is the largest in the determination section 806 is 1/N, and hence the false alarm rate is 1/N.

For example, in the case where the detection of the primary system is performed with the false alarm rate set to 0.1, one feature value, which is the product of the output values of the feature value correlator 804 and the generator of combined peak values of CAF 814, is generated, nine non-feature values, which are the products of the output values of the non-feature value correlator 805 and the generator of combined non-peak values of CAF 815, are generated, and the largest value is selected in the determination section 806. By setting the number of values to be generated as described above, N is set to 10, and the false alarm rate may be set to the desired value, that is, 0.1.

In summary, by setting N in advance, it is possible to detect the primary system with the false alarm rate constantly set to the desired value (1/N) without the need to estimate noise power and interference power.

It should be noted that a plurality of values may be set in advance as N according to the desired value of the false alarm rate for each radio system for which a search is performed, the number of feature values to be generated for the determination, and the like. For example, N may be set to 10 for a particular search target radio system, while N may be set to 100 for another particular search target radio system.

As described above, according to this invention, it is possible to realize such a spectrum sensing method that satisfies the set false alarm rate by using a correlation characteristic of the pilot signal sequence transmitted from the primary system, the cyclicity of the transmitted signal or the frame format of the primary system, the cyclostationarity of the transmitted signal, and the like, which are the feature values of the transmitted signal of the primary system useful for the detection of the primary system.

Further, in the secondary system, by performing the determination processing with the use of a plurality of feature values, in addition to setting the false alarm rate to the desired value, it is possible to reduce the misdetection rate of the primary system.

This invention is applicable to, for example, the purpose of determining whether or not a frequency band is already used or has started to be used by another system or another radio apparatus in a radio communication system in which the frequencies are shared among radio communication systems or radio apparatuses (radio terminals) within a radio communication system.

Here, in the above-mentioned plurality of embodiments, the setting of the false alarm rate to the desired value has been described to be achieved by setting the number (for example, N) of feature values to be generated or the like. However, the desired value of the false alarm rate itself may be set, and N or the like may be calculated by the radio apparatus automatically, to thereby perform the detection processing for the primary system by using a value thus calculated. For example, in the case where the desired value of the false alarm rate is set to 0.1, the radio apparatus determines the number of feature values to be used for the determination, sets to N−n the number of non-feature values which is determined based on n assuming that the number of feature values is n, and calculates the number of non-feature values which allows the false alarm rate to be set to 0.1. Next, the radio system generates the determined number of feature values and the calculated number of non-feature values, and then determines whether or not a signal of the primary system exists. Further, the number of feature values and the number of non-feature values, which are used for the determination, may be set in advance in association with the desired value of the false alarm rate.

Further, the embodiments in which the feature value and the non-feature value are generated and then output to the determination section in the secondary system radio apparatus have been described, but the following configuration may be employed. That is, the generation and/or the determination processing of the feature value and the non-feature value is performed using another device (server or another radio apparatus). In this case, the secondary system radio apparatus performs only the extraction of a signal (RF signal or the like) in the received frequency band, or performs processing up until the generation of the feature value and the non-feature value. Then, the generated signal may be output to another device to cause the another device to perform the rest of the processing, and a determination result thus obtained may be output to the secondary system radio apparatus.

Further, there may be provided a notification section (means) for notifying another secondary system radio apparatus or a server of the determination result through wireless or wired communication, and the determination result may be shared for use.

Further, in the description of the embodiments, the numbers of feature values and non-feature values to be generated are described to be set in advance. However, such set numbers are the numbers of feature values and non-feature values used for the determination in the determination section, and accordingly do not always need to be identical to the numbers of feature values and non-feature values to be generated. For example, a large number of feature values and non-feature values may be generated, and a necessary number of non-feature values may be arbitrarily selected therefrom for the determination.

Further, in the memory, a frequency band for which a search can be performed and information on an extractable feature value for each primary system used in that frequency band may be stored in advance in association with each other, along with other information. To give an example, as primary system information, there are stored a used frequency band (for example, center frequency, bandwidth) of the primary system that is permitted to use a frequency band and is being operated in a frequency band that can be detected by the secondary system radio apparatus, a radio standard, and the extractable feature value, and, in association with the primary system information, there are stored, as information used for generation of the feature value (system setting parameters), the type of a used feature value, the number of feature values to be used in the determination section, the number of non-feature values to be used in the determination section, parameters for generation of various feature values and non-feature values (for example, pilot signal sequence, cyclic time, cyclic frequency and delay time, replica of value of CAF), and the like (see FIG. 16). Further, in addition to the above-mentioned information, N, n, and M serving as the set values for the false alarm rate, the desired value of the false alarm rate, and the like may be stored in advance in association with the system parameters and the pseudo parameters. Further, as the primary system information, a used time slot and the like of the primary system may be recorded and used for improvement in false alarm rate value and misdetection rate value.

It should be noted that the respective sections and the respective types of means of the radio system or the radio apparatus may be implemented by hardware or a combination of hardware and software. In a configuration in which hardware and software are combined, programs are expanded in the RAM or the like, and the respective sections and the respective types of means are implemented by operating such hardware as a control section according to the programs.

Further, this invention has been described with reference to the above-mentioned embodiments, but this invention is not limited to the above-mentioned embodiments. Various modifications obvious to a person skilled in the art may be made to the configuration and specific details of this invention without departing from the scope of this invention.

This application claims priority from Japanese Patent Application No. 2008-137471, filed on May 27, 2008, the contents of which are hereby incorporated by reference.

DESCRIPTION OF REFERENCE NUMERALS

10 reference received power area
100, 110 primary system radio apparatus
200 secondary system radio apparatus
300, 400, 500, 600, 700, 800 secondary system radio apparatus according to this invention
301, 401, 501, 601, 701, 801 antenna
302, 402, 502, 602, 702, 802 RF analog section (frequency converter)
306, 406, 506, 606, 706, 806 determination section
303 memory for system parameter (memory)
304 feature value generator
305 non-feature value generator
403 memory for pilot signal sequence (memory)
404 autocorrelator
405 cross-correlator
410 pilot signal sequence
411, 412 pseudo-random signal sequence
421, 422, 423 correlator
431, 432, 433 largest-value selection section
503 memory for cyclic time (memory)

504 feature value correlator
505 non-feature value correlator
511 delay section
512 correlator
521 cyclic time
522, 523 acyclic time
603 memory for the parameter of CAF (memory)
604 generator of peak values of CAF
605 generator of non-peak values of CAF
611, 612, 613 cyclic frequency at which the cyclic autocorrelation function reaches the peak
621, 622, 623 cyclic frequency at which the cyclic autocorrelation function does not reach the peak
631 peak set
632 non-peak set
703 memory for the parameter of CAF combining (memory)
704 generator of combined peak values of CAF
705 generator of combined non-peak values of CAF
711, 712, 713 cyclic frequency at which the cyclic autocorrelation function reaches the peak
721, 722, 723, 731, 732, 733 cyclic frequency at which the cyclic autocorrelation function does not reach the peak
741 peak set
742, 743 non-peak set
803 memory for cyclic time (memory)
804 feature value correlator
805 non-feature value correlator
813 memory for the parameter of CAF combining (memory)
814 generator of combined peak values of CAF
815 generator of combined non-peak values of CAF
1010, 1020, 1030, 1110, 1120, 1130 OFDM symbol
2010, 2020, 2030, 2040, 2130, 2220, 2310, 2320 pilot signal sequence

The invention claimed is:

1. A cognitive radio system, comprising:
a memory which stores a system parameter and a pseudo parameter, the system parameter being used for generation of a feature value specific to a radio system for which a search is performed, the pseudo parameter being similar to the system parameter;
a feature value generator which generates one or a plurality of feature values based on a signal in a received frequency band by using the system parameter;
a non-feature value generator which generates one or a plurality of non-feature values based on the signal in the received frequency band by using the pseudo parameter; and
a determination section which determines whether or not a signal of the radio system exists by using the one or the plurality of feature values and the one or the plurality of non-feature values.

2. A cognitive radio system according to claim 1, wherein the determination section makes a comparison as to which of the one or the plurality of feature values and the one or the plurality of non-feature values are larger, determines, in a case where the one or the plurality of feature values are larger, that the signal of the radio system exists, and determines, in a case where the one or the plurality of non-feature values are larger, that the signal of the radio system does not exist.

3. A cognitive radio system according to claim 1, wherein a number of the feature values and a number of the non-feature values, which are used for the determination in the determination section, are numbers set based on a desired value of a false alarm rate.

4. A cognitive radio system according to claim 1, wherein a number of the feature values used for the determination in the determination section is a number corresponding to a desired value of a misdetection rate.

5. A cognitive radio system according to claim 1, wherein, when a number of the feature values used for the determination is set as n, and a number of the non-feature values used for the determination is set as N−n, where n is an integer equal to or larger than 1 and N is an integer equal to or larger than n+1:
the determination section selects m values in descending order from among the generated one or plurality of feature values and the generated one or plurality of non-feature values, where m is an integer that satisfies m≤n, and determines, in a case where all the m values are the generated one or plurality of feature values, that the radio system exists; and
the determination section determines, in a case where the m values contain the generated one or plurality of non-feature values, that the radio system does not exist.

6. A cognitive radio system according to claim 1, wherein the memory stores in advance a frequency band for which the search can be performed and information on an extractable feature value for each of a plurality of radio systems used in the frequency band in association with each other.

7. A cognitive radio system according to claim 1, wherein:
the memory stores, as the system parameter, a cyclic frequency and a delay time with which a cyclic autocorrelation function (CAF) of a transmitted signal of the radio system reaches a peak, and stores, as the pseudo parameter, a cyclic frequency and a delay time with which the CAF of the transmitted signal of the radio system does not reach the peak;
the feature value generator generates, as the generated one or plurality of feature values, one or a plurality of peak values of CAF representing the peak of the CAF based on the signal in the received frequency band by using the system parameter;
the non-feature value generator generates, as the generated one or plurality of non-feature values, one or a plurality of non-peak values of CAF not representing the peak of the CAF based on the signal in the received frequency band by using the pseudo parameter; and
the determination section determines whether or not the signal of the radio system exists by using the one or the plurality of peak values of CAF and the one or the plurality of non-peak values of CAF.

8. A cognitive radio system according to claim 1, wherein:
the memory stores replicas of values of cyclic autocorrelation function (CAF) calculated in advance, a cyclic frequency and a delay time with which a CAF of a transmitted signal of the radio system reaches a peak as the system parameter, and a cyclic frequency and a delay time with which the CAF of the transmitted signal of the radio system does not reach the peak as the pseudo parameter;
the feature value generator generates a plurality of peak values of CAF representing the peak of the CAF based on the signal in the received frequency band by using the system parameter, to thereby generate, as the generated one or plurality of feature values, a combined peak value of CAF by performing complex weighting and combining with use of the generated plurality of peak values of CAF and the replicas of the values of CAF;
the non-feature value generator generates a plurality of non-peak values of CAF not representing the peak of the CAF based on the signal in the received frequency band by using the pseudo parameter, to thereby generate, as the generated one or plurality of non-feature values, a combined non-peak value of CAF by performing the complex weighting and combining with use of the generated plurality of non-peak values of CAF and the replicas of the values of CAF; and the determination section determines whether or not the signal of the radio system exists by using real parts or complex absolute values of the combined peak value of CAF and the combined non-peak value of CAF.

9. A cognitive radio system according to claim 1, wherein:
the memory stores, as the system parameter, one or a plurality of cyclic times representing a repetition time of a signal sequence contained in a transmitted signal received from the radio system, and stores, as the pseudo parameter, one or a plurality of acyclic times different from the one or the plurality of cyclic times;

the feature value generator generates the one or the plurality of feature values through correlation processing between the transmitted signal and a delayed signal obtained by being delayed by the one or the plurality of cyclic times;

the non-feature value generator generates the one or the plurality of non-feature values through the correlation processing between the transmitted signal and a delayed signal obtained by being delayed by the one or the plurality of acyclic times; and the determination section determines whether or not the signal of the radio system exists by using the one or the plurality of the feature values and the one or the plurality of non-feature values.

10. A cognitive radio system according to claim 9, wherein the one or the plurality of cyclic times are an effective symbol length of an OFDM signal, or a block length of an SC-FDMA signal excluding a cyclic prefix length, or an interval with which a cyclic prefix is inserted, or an interval with which a pilot signal sequence is inserted.

11. A cognitive radio system according to claim 1, wherein:
the memory stores, as the system parameter, a signal sequence of a control signal of the radio system, and stores, as the pseudo parameter, a plurality of signal sequences of a pseudo control signal, which are different from the signal sequence of the control signal;

the feature value generator generates the one or the plurality of feature values through correlation processing between a transmitted signal and the control signal;

the non-feature value generator generates the one or the plurality of non-feature values through the correlation processing between the transmitted signal and the pseudo control signal; and the determination section determines whether or not the signal of the radio system exists by using the one or the plurality of feature values and the one or the plurality of non-feature values.

12. A cognitive radio system according to claim 11, wherein the signal sequence of the control signal comprises a pilot signal sequence inserted into the transmitted signal, and each of the plurality of signal sequences of the pseudo control signal comprises a random signal sequence having the same length as the pilot signal sequence.

13. A cognitive radio system according to claim 1, wherein:
the memory stores, as system parameters, a combination of two or more types selected from a cyclic frequency and a delay time with which a cyclic autocorrelation function (CAF) reaches a peak, a cyclic time representing a repetition time of a signal sequence, a signal sequence of a control signal, and a replica of a value of CAF calculated in advance, which correspond to features contained in a transmitted signal of the radio system;

the memory stores a combination of pseudo parameters corresponding to the system parameters; and the determination section determines whether or not the signal of the radio system exists by using the one or the plurality of feature values and the one or the plurality of non-feature values, which are generated based on output values of the feature value generator and the non-feature value generator, respectively, the output values being obtained based on the two or more types of the system parameters corresponding to the features contained in the transmitted signal of the radio system and the pseudo parameters.

14. A radio signal detection method, comprising:
receiving a radio signal in a frequency band for which a search is performed;

generating one or a plurality of feature values by using the signal in the received frequency band and a system parameter of a radio system for which the search is performed;

generating one or a plurality of non-feature values by using the signal in the received frequency band and a pseudo parameter similar to the system parameter; and determining whether or not a signal of the radio system exists by using the one or the plurality of feature values and the one or the plurality of non-feature values.

15. A radio signal detection method according to claim 14, wherein the determining comprises:
making a comparison as to which of the one or the plurality of feature values and the one or the plurality of non-feature values are larger;

determining, in a case where the one or the plurality of feature values are larger, that the signal of the radio system exists; and determining, in a case where the one or the plurality of non-feature values are larger, that the signal of the radio system does not exist.

16. A radio signal detection method according to claim 14, further comprising adjusting a false alarm rate to a desired value by setting in advance a number of the one or the plurality of feature values and a number of the one or the plurality of non-feature values.

17. A radio signal detection method according to claim 14, further comprising adjusting a misdetection rate to a desired value by setting in advance a number of the one or the plurality of feature values used.

18. A radio signal detection method according to claim 14, further comprising:
frequency-converting the radio signal in the frequency band for which the search is performed to a baseband signal or an IF signal;

generating one or a plurality of peak values of a cyclic autocorrelation function (CAF) as the feature values representing a peak of the CAF by using the baseband signal or the IF signal and a cyclic frequency and a delay time with which the CAF of a transmitted signal of the radio system for which the search is performed reaches the peak;

generating one or a plurality of non-peak values of CAF as the non-feature values not representing the peak of the CAF by using the baseband signal or the IF signal and a cyclic frequency and a delay time with which the CAF of the transmitted signal of the radio system for which the search is performed does not reach the peak; and determining whether or not the signal of the radio system exists by using the one or the plurality of peak values of CAF and the one or the plurality of non-peak values of CAF.

19. A radio signal detection method according to claim 18, wherein the determining comprises:
   making a comparison between the one or the plurality of peak values of CAF and the one or the plurality of non-peak values of CAF, or between a combined peak value of CAF and a combined non-peak value of CAF, the combined peak value of CAF being obtained through in-phase combining of the peak values of CAF by using replicas of values of CAF of the transmitted signal of the radio system for which the search is performed, the combined non-peak value of CAF being generated based on the non-peak values of CAF by using the replicas of the values of CAF; and
   determining, in a case where the one or the plurality of peak values of CAF are larger than the one or the plurality of non-peak values of CAF, that the signal of the radio system exists, and determining, in a case where the one or the plurality of non-peak values of CAF are larger than the one or the plurality of peak values of CAF, that the signal of the radio system does not exist, or
   determining, in a case where the combined peak value of CAF is larger than the combined non-peak value of CAF, that the signal of the radio system exists, and determining, in a case where the combined non-peak value of CAF is larger than the combined peak value of CAF, that the signal of the radio system does not exist.

20. A radio signal detection method according to claim 14, further comprising:
   extracting, as an RF signal, the radio signal in the frequency band for which the search is performed, or frequency-converting the RF signal to a baseband signal or an IF signal;
   generating the feature values through correlation processing that uses the RF signal or the frequency-converted baseband signal or the frequency-converted IF signal and a delayed signal obtained by being delayed by one or a plurality of cyclic times, which are each a repetition time of a signal sequence used by the radio system for which the search is performed;
   generating the non-feature values through the correlation processing that uses the RF signal or the frequency-converted baseband signal or the frequency-converted IF signal and one or a plurality of delayed signals obtained by being delayed by one or a plurality of acyclic times different from the one or the plurality of cyclic times; and
   determining whether or not the signal of the radio system exists by using the one or the plurality of feature values and the one or the plurality of non-feature values.

21. A radio signal detection method according to claim 20, wherein the one or the plurality of cyclic times are an effective symbol length of an OFDM signal, or a block length of an SC-FDMA signal excluding a cyclic prefix length, or an interval with which a cyclic prefix is inserted, or an interval with which a pilot signal sequence is inserted.

22. A radio signal detection method according to claim 14, further comprising:
   frequency-converting the radio signal in the frequency band for which the search is performed to a baseband signal;
   generating the feature values through correlation processing that uses the frequency-converted baseband signal and one or a plurality of pilot signal sequences used by the radio system for which the search is performed;
   generating the non-feature values through the correlation processing that uses the frequency-converted baseband signal and one or a plurality of pseudo-random signal sequences similar to the one or the plurality of pilot signal sequences; and
   determining whether or not the signal of the radio system exists by using the one or the plurality of feature values and the one or the plurality of non-feature values.

23. A radio signal detection method according to claim 14, further comprising:
   generating the one or the plurality of feature values by using, as system parameters, a combination of two or more types selected from a cyclic frequency and a delay time with which a cyclic autocorrelation function (CAF) reaches a peak, a cyclic time representing a repetition time of a signal sequence, a signal sequence of a control signal, and a replica of a value of CAF calculated in advance, which correspond to features contained in a transmitted signal of the radio system;
   generating the one or the plurality of non-feature values by using a combination of pseudo parameters corresponding to the system parameters; and
   determining whether or not the signal of the radio system exists by using the one or the plurality of feature values and the one or the plurality of non-feature values.

* * * * *